United States Patent
Suzuki

(10) Patent No.: US 11,829,824 B2
(45) Date of Patent: Nov. 28, 2023

(54) MEDIUM STACKER AND IMAGE FORMING SYSTEM INCORPORATING THE MEDIUM STACKER

(71) Applicant: Nobuyoshi Suzuki, Tokyo (JP)

(72) Inventor: Nobuyoshi Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 356 days.

(21) Appl. No.: 17/182,299

(22) Filed: Feb. 23, 2021

(65) Prior Publication Data
US 2021/0279538 A1    Sep. 9, 2021

(30) Foreign Application Priority Data
Mar. 5, 2020 (JP) .................................. 2020-037620

(51) Int. Cl.
*B65H 29/06* (2006.01)
*G06K 15/00* (2006.01)
(Continued)

(52) U.S. Cl.
CPC ......... *G06K 15/404* (2013.01); *B41J 11/0095* (2013.01); *B41J 13/0045* (2013.01);
(Continued)

(58) Field of Classification Search
CPC ........ B65H 29/06; B65H 31/02; B65H 37/04; B65H 43/02; B65H 2301/44338;
(Continued)

(56) References Cited

U.S. PATENT DOCUMENTS 4,431,177 A * 2/1984 Beery .................... B65H 33/08
271/186
4,537,390 A * 8/1985 Kiamco ............. B65H 29/6609
270/58.29

(Continued)

FOREIGN PATENT DOCUMENTS

| EP | 2253569 A2 * | 11/2010 | ............. B65H 15/02 |
| JP | 6-227723 | 8/1994 | |
| JP | 2019-094188 | 6/2019 | |

OTHER PUBLICATIONS

Espacenet machine translation of EP2253569A2; https://translationportal.epo.org/emtp/translate/?ACTION=description-retrieval&COUNTRY=EP&ENGINE=google&FORMAT=docdb&KIND=A2&LOCALE=en_EP&NUMBER=2253569&OPS=ops.epo.org/3.2&SRCLANG=de&TRGLANG=en (Year: 2010).*

*Primary Examiner* — Leslie A Nicholson, III
(74) *Attorney, Agent, or Firm* — Harness, Dickey & Pierce, P.L.C.

(57) ABSTRACT

A medium stacker includes a stacking portion, a rotary portion, a medium holder, a medium mover, and circuitry. The stacking portion has a stacking face to stack a sheet medium on which an image is formed. The rotary portion is configured to hold a leading end of the sheet medium in a sheet conveyance direction, reverse the sheet medium on the stacking face of the stacking portion, and convey the sheet medium. The medium holder is configured to hold the sheet medium when the sheet medium is conveyed by the rotary portion. The medium mover is configured to move the sheet medium to a predetermined position in a direction orthogonal to the sheet conveyance direction of the sheet medium while the sheet medium is held by the rotary portion. The circuitry is configured to control the rotary portion and the medium mover.

17 Claims, 21 Drawing Sheets

(51) Int. Cl.
  *G06K 15/16* (2006.01)
  *B41J 11/00* (2006.01)
  *G06K 15/10* (2006.01)
  *B41J 13/00* (2006.01)
  *B65H 37/04* (2006.01)

(52) U.S. Cl.
  CPC ............ *B65H 29/06* (2013.01); *B65H 37/04* (2013.01); *G06K 15/102* (2013.01); *G06K 15/16* (2013.01); *G06K 15/4065* (2013.01); *B65H 2301/3613* (2013.01); *B65H 2301/44338* (2013.01); *B65H 2405/54* (2013.01)

(58) Field of Classification Search
  CPC ........... B65H 2301/44324; B65H 2301/44714; B65H 2405/54; G06K 15/404; G06K 15/102; G06K 15/16; G06K 15/4065; B41J 11/0095; B41J 13/0045
  USPC .............. 270/19, 38, 47, 60, 58.02; 271/187
  See application file for complete search history.

(56) References Cited

U.S. PATENT DOCUMENTS

| | | | | |
|---|---|---|---|---|
| 4,603,849 A * | 8/1986 | Nakamura | ............. | B65H 29/40 271/186 |
| 5,013,026 A * | 5/1991 | Howell | .................. | B65H 29/40 271/163 |
| 5,551,681 A * | 9/1996 | Ferrara | .................... | B42B 5/00 270/58.08 |
| 5,692,740 A * | 12/1997 | Holtje | .................... | B65H 29/40 270/58.01 |
| 5,803,705 A * | 9/1998 | Keyes | .................... | B65H 29/40 414/794 |
| 6,109,605 A * | 8/2000 | Hirota | .................... | B65H 29/06 271/82 |
| 6,619,653 B2 * | 9/2003 | Dobrindt | ................ | B65H 33/08 414/791.2 |
| 7,975,999 B2 * | 7/2011 | Fukasawa | .............. | B65H 37/04 270/32 |
| 8,235,382 B2 * | 8/2012 | Taniguchi | .............. | B65H 29/40 271/187 |
| 2013/0264762 A1 | 10/2013 | Matsushita et al. | | |
| 2013/0270762 A1 | 10/2013 | Saito et al. | | |
| 2013/0300050 A1 | 11/2013 | Suzuki et al. | | |
| 2014/0138896 A1 | 5/2014 | Yoshida et al. | | |
| 2014/0151951 A1 | 6/2014 | Shibasaki et al. | | |
| 2014/0219747 A1 | 8/2014 | Takahashi et al. | | |
| 2015/0003938 A1 | 1/2015 | Morinaga et al. | | |
| 2015/0028540 A1 | 1/2015 | Shibasaki et al. | | |
| 2015/0030414 A1 | 1/2015 | Takahashi et al. | | |
| 2015/0076759 A1 | 3/2015 | Kosuge et al. | | |
| 2015/0091246 A1 | 4/2015 | Yoshida et al. | | |
| 2015/0360899 A1 | 12/2015 | Takahashi et al. | | |
| 2016/0340144 A1 | 11/2016 | Sakano et al. | | |
| 2016/0340145 A1 | 11/2016 | Kunieda et al. | | |
| 2016/0360053 A1 | 12/2016 | Suzuki et al. | | |
| 2017/0174465 A1 | 6/2017 | Morinaga et al. | | |
| 2017/0217239 A1 | 8/2017 | Suzuki et al. | | |
| 2017/0305706 A1 | 10/2017 | Takahashi et al. | | |
| 2018/0259895 A1 | 9/2018 | Shibasaki et al. | | |
| 2020/0140222 A1 | 5/2020 | Takahashi et al. | | |

\* cited by examiner

MEDIUM STACKER AND IMAGE FORMING SYSTEM INCORPORATING THE MEDIUM STACKER

CROSS-REFERENCE TO RELATED APPLICATION

This patent application is based on and claims priority pursuant to 35 U.S.C. § 119(a) to Japanese Patent Application No. 2020-037620, filed on Mar. 5, 2020, in the Japan Patent Office, the entire disclosure of which is hereby incorporated by reference herein.

BACKGROUND

Technical Field

Embodiments of the present disclosure relate to a medium stacker and an image forming system incorporating the medium stacker.

Background Art

Various types of inkjet printers are known as image forming apparatuses each forming an image on a recording medium using a liquid material such as liquid ink. There are medium stackers each of which functions as a post-processing apparatus to perform an alignment process to align the end portion of each recording medium ejected from an image forming apparatus and stack the bundle of recording media, a binding process to bind the end portion of the recording media, or both. Further, various types of image forming systems are known to include a configuration in which an image forming apparatus and a medium stacker are coupled with each other.

Such an inkjet printer includes a reverse conveyance portion, at which a sheet-like recording medium (sheet) having an image on the surface is reversed with the surface having the image facing down and is sequentially stacked on the stacking portion while the leading end of the recording medium is conveyed first, so as to perform a post-processing operation to the recording medium or recording media stacked on the stacking face of the stacking portion.

SUMMARY

At least one aspect of this disclosure, a novel medium stacker includes a stacking portion, a rotary portion, a medium holder, a medium mover, and circuitry. The stacking portion has a stacking face to stack a sheet medium on which an image is formed. The rotary portion is configured to hold a leading end of the sheet medium in a sheet conveyance direction, reverse the sheet medium on the stacking face of the stacking portion, and convey the sheet medium. The medium holder is configured to hold the sheet medium when the sheet medium is conveyed by the rotary portion. The medium mover is configured to move the sheet medium to a predetermined position in a direction orthogonal to the sheet conveyance direction of the sheet medium while the sheet medium is held by the rotary portion. The circuitry is configured to control the rotary portion and the medium mover.

Further, at least one aspect of this disclosure, an image forming system includes an image forming apparatus and the above-described medium stacker. The image forming apparatus includes an image forming device configured to form an image on a sheet medium with a liquid material, and a sheet conveying device configured to convey the sheet medium having the image formed by the image forming device. The medium stacker is configured to stack the medium conveyed from the image forming apparatus.

Further, at least one aspect of this disclosure, a novel medium stacker includes a stacking portion, a rotary portion, a medium holder, and circuitry. The stacking portion has a stacking face to stack a sheet medium on which an image is formed. The rotary portion is configured to hold a leading end of the sheet medium in a sheet conveyance direction, reverse the sheet medium on the stacking face of the stacking portion, and convey the sheet medium. The medium holder is configured to hold the sheet medium when the sheet medium is conveyed by the rotary portion. The medium holder includes a first holder and a second holder. The first holder is configured to hold the leading end of the sheet medium in the sheet conveyance direction, on an outer circumferential surface of the rotary portion. The second holder is configured to hold a portion of the sheet medium other than the leading end of the sheet medium, on the rotary portion when the sheet medium is conveyed by the rotary portion. The circuitry is configured to control the rotary portion.

Further, at least one aspect of this disclosure, an image forming system includes an image forming apparatus and the above-described medium stacker. The image forming apparatus includes an image forming device configured to form an image on a sheet medium with a liquid material, and a sheet conveying device configured to convey the sheet medium having the image formed by the image forming device. The medium stacker is configured to stack the medium conveyed from the image forming apparatus.

BRIEF DESCRIPTION OF THE SEVERAL VIEWS OF THE DRAWINGS

Exemplary embodiments of this disclosure will be described in detail based on the following figures, wherein.

Figure 1:
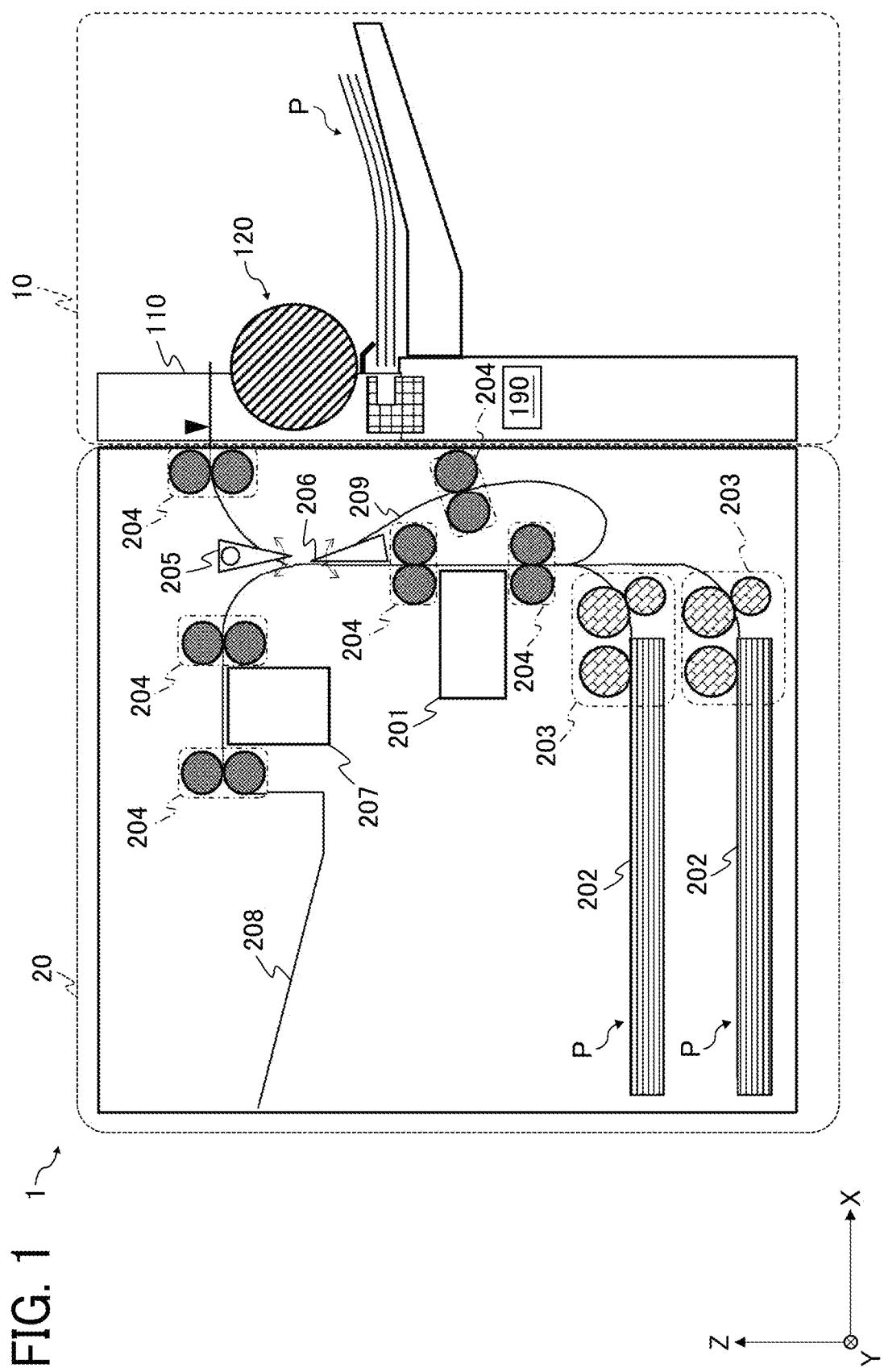
FIG. 1 is a schematic view illustrating an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, descriptions are given of a post-processing apparatus as a medium stacker according to an embodiment of the present disclosure and an image forming system according to an embodiment of the present disclosure, with reference to the accompanying drawings. As an embodiment of the post-processing apparatus according to the present disclosure, there is a sheet stacking unit functioning as a medium stacker that stacks the sheet-like medium ejected from the image forming apparatus and executes an alignment process, for example. Further, as an embodiment of the image forming system according to the present disclosure, there is an inkjet printer including an image forming apparatus and a medium stacker. The image forming apparatus includes an image forming device that forms an image on a sheet-like medium with liquid ink that is a liquid material, and a sheet conveying device that conveys the sheet-like medium having the image formed by the image forming device. The medium stacker includes a stacking portion that stacks the sheet-like medium conveyed from the image forming apparatus and aligns a bundle of sheet-like media including the sheet-like medium.

Embodiment of Image Forming System

FIG. 1 is a schematic view illustrating the whole configuration of an inkjet printer 1 that functions as an image forming system according to an embodiment of the present disclosure.

The inkjet printer 1 includes an image forming apparatus 20 and a sheet stacker 10. The sheet stacker 10 that functions as a medium stacker that stacks a sheet P at a predetermined position. The sheet P functions as a sheet-like medium or sheet medium ejected from the image forming apparatus 20. The sheet stacker 10 corresponds to a post-processing apparatus and functions as a medium stacker according to an embodiment of the present disclosure.

Overview of Image Forming Apparatus 20

First, a description is given of the overview of the image forming apparatus 20. The image forming apparatus 20 includes an image forming device 201, a sheet container 202, a sheet feeding device 203, a sheet conveying device 204, a sheet conveyance passage changer 205, a sheet reverse passage changer 206, a dryer 207, a sheet ejection tray 208, and a sheet reverse passage 209.

The image forming device 201 includes liquid discharge heads having respective discharging ports (nozzles). The liquid discharge heads discharge respective liquid inks of four colors, for example, of Y (yellow), M (magenta), C (cyan), and K (black). The liquid discharge head is separately provided to discharge liquid ink of each color. The liquid ink is supplied to each liquid discharge head included in the image forming device 201 by an ink supply pump that is coupled with each ink cartridge. Therefore, the liquid ink is supplied to each liquid discharge head by the ink supply pump from the ink cartridge containing the liquid ink of each color. Note that the ink cartridge of each color is detachably attached to a cartridge charger included in the image forming apparatus 20.

The sheet container 202 includes a plurality of sheet feed trays each stacking and containing a sheet P that functions as a sheet medium.

The sheet feeding device 203 includes a sheet pickup roller, a sheet separation roller, and a sheet reverse roller, so that sheets P contained in the sheet container 202 are separated and fed one by one.

The sheet conveying device 204 includes the plurality of pairs of sheet conveying rollers disposed at different positions along the sheet conveyance passage of the sheet P. Each pair of sheet conveying rollers includes a sheet conveying roller and a spur wheel. Each pair of sheet conveying rollers is rotated by a conveyance drive device to convey the sheet P in the predetermined direction at the predetermined conveying speed. Note that one of the pair of sheet conveying rollers is not limited to a spur wheel but may be a rotary body that has the substantially same size of the contact area to contact the sheet P as the contact area of the spur wheel and that partly contacts the sheet P. For example, the rotary body may be an abrasive roller having an abrasive surface.

The sheet conveyance passage changer 205 includes a switching claw that changes the sheet conveyance direction of the sheet P having an image formed by the image forming device 201. The sheet conveyance passage changer 205 changes the direction of conveyance of the sheet P whether to the sheet ejection tray 208 or to the sheet stacker 10.

The sheet reverse passage changer 206 includes a switching claw that guides the sheet P to the sheet reverse passage 209. The sheet reverse passage 209 reverses the image forming surface of the sheet P and conveys the sheet P to the image forming device 201. When forming images on both sides (i.e., the front and back faces) of the sheet P, the sheet P having an image formed by the image forming device 201 on the first face (e.g., the front face) is conveyed downstream temporarily. Then, after the sheet reverse passage changer 206 changes the sheet conveyance passage, the sheet P is conveyed upstream (in the reverse direction), so that the sheet P is conveyed to another sheet conveyance passage that guides the sheet P form the sheet reverse passage 209 to the image forming device 201. Thereafter, the image forming device 201 forms an image on the second face of the reversed sheet P that faces the image forming device 201. The second face of the sheet P is the opposite face of the first face (e.g., the back face).

The dryer 207 includes a heater that heats the sheet P by blowing warm air to the sheet P to dry the image forming surface (the first face) of the sheet P that is ejected to the sheet ejection tray 208.

The sheet ejection tray 208 is a sheet stacking tray to stack the sheet P that is dried by the dryer 207.

Embodiment of Sheet Stacker

Next, a description is given of the sheet stacker 10 according to an embodiment of the present disclosure.

Figure 2:
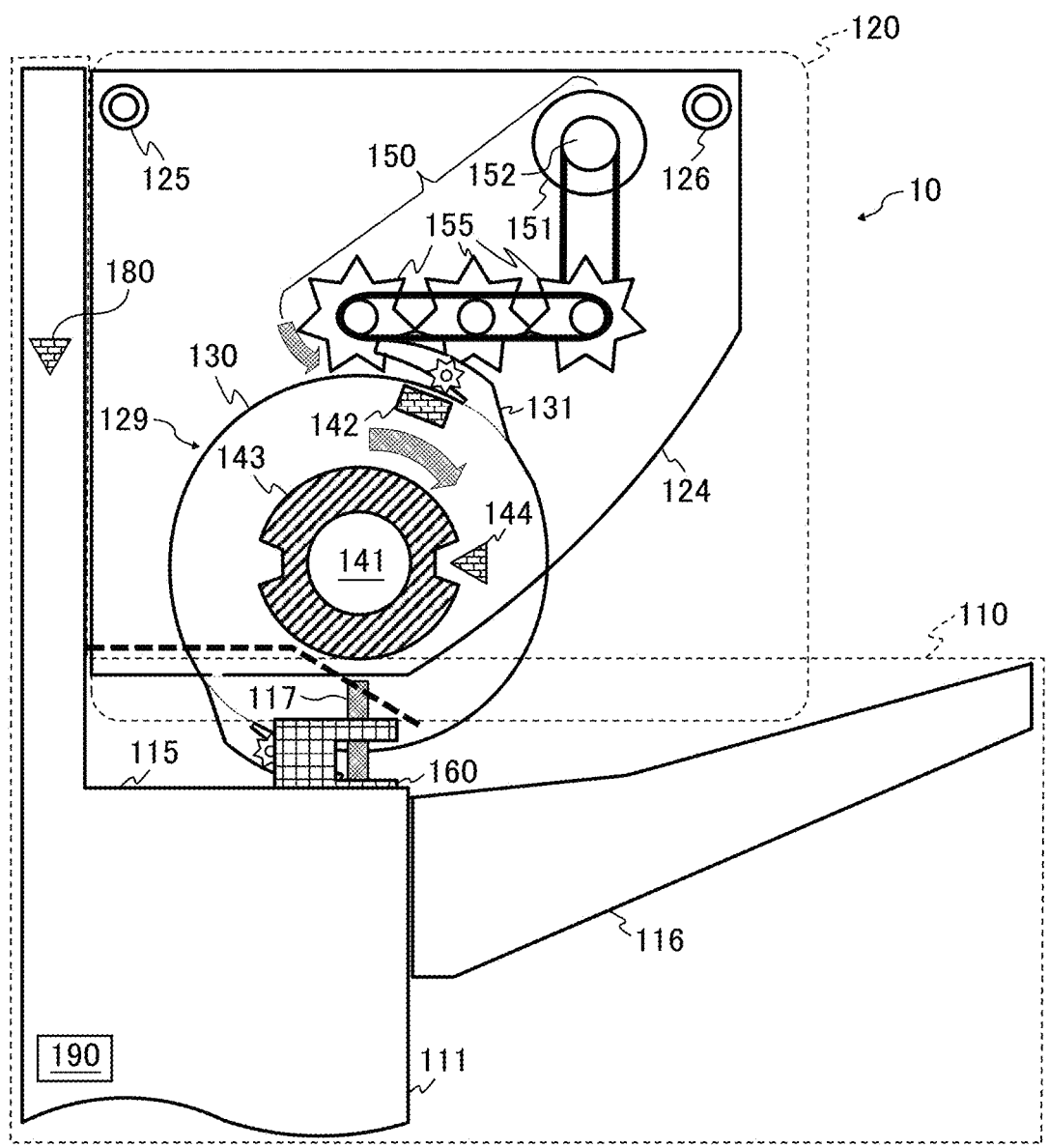
FIG. 2 is a front view illustrating the whole configuration of a sheet stacker according to an embodiment of a post-processing apparatus according to the present disclosure.

FIG. 2 is a front view illustrating the whole configuration of the sheet stacker 10 according to the present embodiment.

Figure 3:
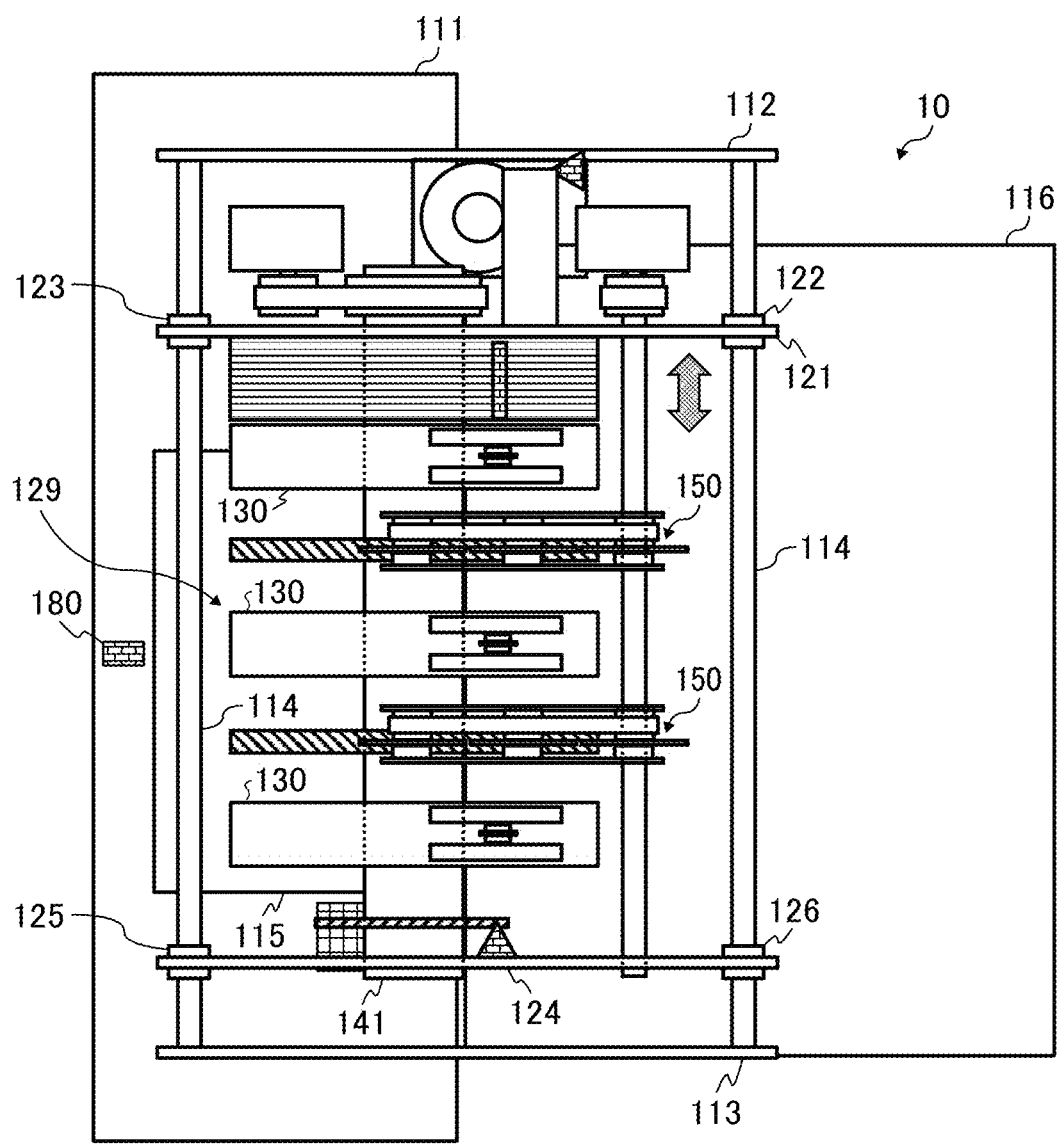
FIG. 3 is a plan view illustrating the whole configuration of the sheet stacker according to the present embodiment.

FIG. 3 is a plan view illustrating the whole configuration of the sheet stacker 10 according to the present embodiment.

As illustrated in FIGS. 2 and 3, the sheet stacker 10 includes a stacker body 110 and a disk unit 120. The stacker body 110 is provided with a controller 190 that functions as circuitry to control the operations of the sheet stacker 10. The disk unit 120 is held by the stacker body 110 and is movable in the predetermined direction to the stacker body 110. Note that the position of the stacker body 110 is fixed to the sheet ejection port through which the sheet P is ejected from the image forming apparatus 20.

The stacker body 110 includes trays, which are a fixed tray 115 and a movable tray 116, each functioning as a stacking portion to stack the sheet P that is reversed by the disk unit 120 and conveyed to a selected on of the trays. Further, the stacker body 110 includes a leading end stopper 117 that functions as a leading end regulator. The leading end stopper 117 aligns the leading end of the sheet P (the leading end of the sheet P in the sheet conveyance direction) by regulating the leading end of the sheet P at the predetermined position while the sheet P is stacked on the tray and corrects the position of the conveyed sheet P.

The stacker body 110 further includes a sheet entrance detection sensor 180 that functions as a sheet entrance detector to detect the sheet P that is ejected from the image forming apparatus 20 that is an upstream apparatus and conveyed to the sheet entrance detection sensor 180. The sheet entrance detection sensor 180 is disposed on an extension of the sheet ejection port through which the sheet P is ejected from the image forming apparatus 20, near the sheet entrance port of the stacker body 110, and on the upstream side of the sheet conveyance passage. The sheet entrance detection sensor 180 detects whether the sheet P is at the setting position. Further, the timing at which the leading end of the sheet P in the sheet conveyance direction passes the setting position and the timing at which the trailing end of the sheet P in the sheet conveyance direction passes the setting position, based on the detection result of the sheet entrance detection sensor 180. That is, the sheet entrance detection sensor 180 detects "receipt" of the sheet P to the sheet stacker 10, and the sheet stacker 10 starts the predetermined operation based on the detection result as a trigger.

The disk unit 120 is provided with a disk 130 that functions as a circular member. The disk 130 is included in a rotary portion 129 that reverses the sheet P over the fixed tray 115 and the movable tray 116 or on the movable tray 116 and conveys to stack the sheet P. The disk unit 120 is also provided with a medium position retainer 150 that functions as a medium holder that holds the position of the sheet P that is conveyed by the disk 130. Note that the medium position retainer 150 functions as a second holder that holds a portion of the sheet P other than the leading end of the sheet P (i.e., the trailing end of the sheet P or the downstream side of the sheet P from the trailing end of the sheet P in the sheet conveyance direction). The medium position retainer 150 includes a spur wheel group 155 that functions as a rotary member that contacts the sheet P to keep the position of the sheet P (in particular, the trailing end of the sheet P in the sheet conveyance direction) in a certain range while the sheet P is conveyed. The details of the medium position retainer 150 are described below.

The disk unit 120 includes a medium mover to change the position of the sheet P in a direction orthogonal to the sheet conveyance direction to the stacker body 110. The direction orthogonal to the sheet conveyance direction represents the Y direction. According to this configuration, the disk unit 120 conveys the sheet P to align the position of the sheet P in the width direction (the Y direction) to the predetermined position. The disk unit 120 further includes a mechanism to move the sheet P in the direction perpendicular to the sheet conveyance direction and to reverse and convey the sheet P to a predetermined stacking position at which the sheet P is stacked on the tray of the stacker body 110.

Detailed Description of Stacker Body 110

Next, a detailed description is given of the configuration of the stacker body 110.

Figure 4:
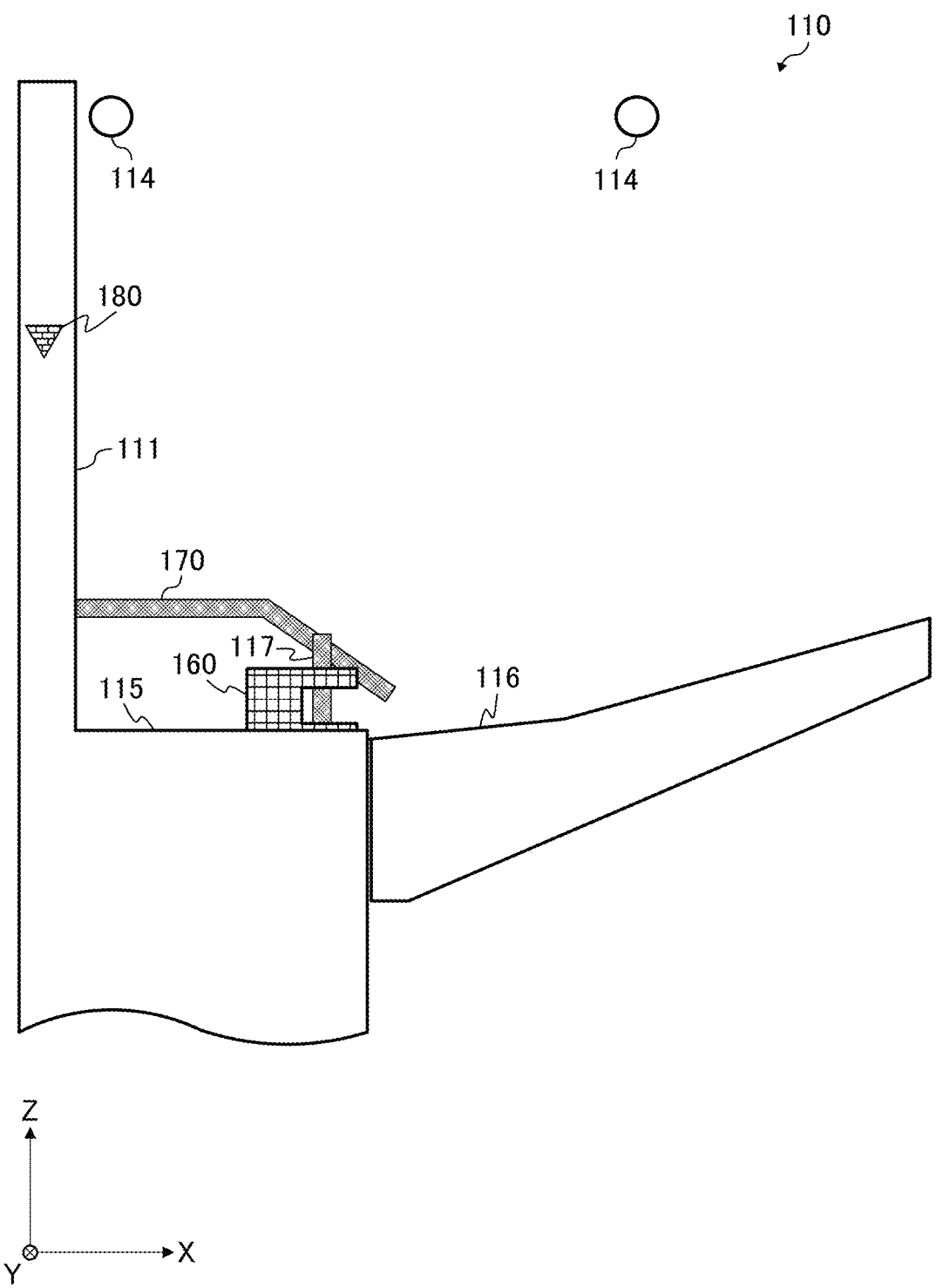
FIG. 4 is a front view illustrating a stacker body of the sheet stacker of FIG. 3.

FIG. 4 is a front view illustrating the stacker body 110 of the sheet stacker 10 of FIG. 3.

Figure 5:
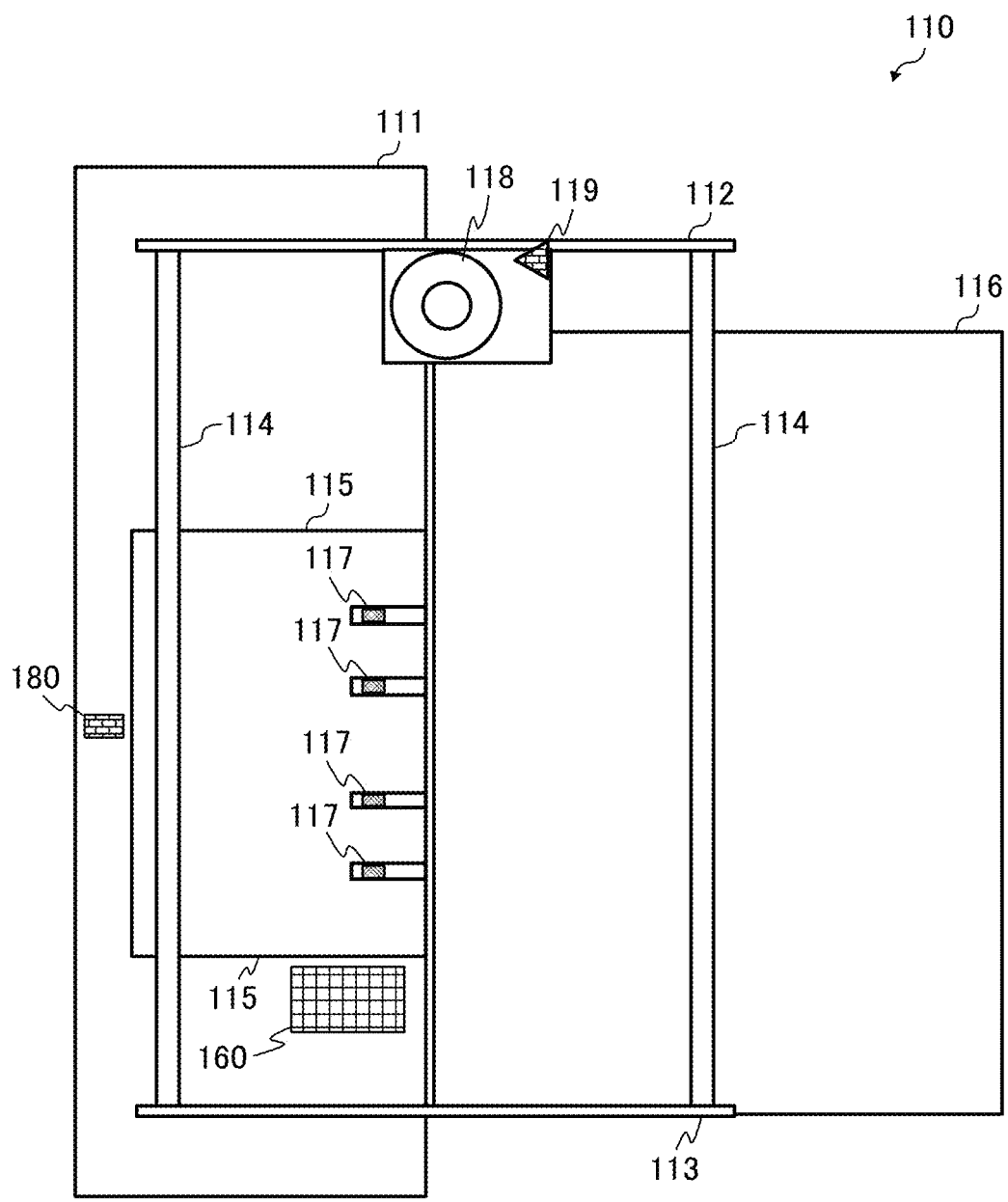
FIG. 5 is a plan view illustrating the stacker body of the sheet stacker.

FIG. 5 is a plan view illustrating the stacker body 110 of the sheet stacker 10.

As illustrated in FIGS. 4 and 5, the stacker body 110 includes a housing 111, the fixed tray 115, and the movable tray 116. The fixed tray 115 is provided with the housing 111 as a single unit. The movable tray 116 has a flat (horizontal) face and a sloped face. The flat face extends from the distal end of the fixed tray 115 in the X direction. The sloped face is inclined (as a sloped portion) slightly upward (the Z direction) from the tip end of the flat face.

Further, a stapler 160 is provided near the housing 111, in other words, the top face of the fixed tray 115, that is, the surface (the stacking face) to stack the sheet P conveyed from the disk unit 120. The stapler 160 functions as a binder to perform a binding process to bind the end of the sheet P. Further, the leading end stopper 117 is mounted on the fixed tray 115. The leading end stopper 117 is a regulating member functioning as a leading end regulator to regulate the position of the leading end of the sheet P in the sheet conveyance direction (the leading end in the sheet conveyance direction) conveyed by the disk unit 120.

The leading end regulator includes a moving mechanism to move the leading end stopper 117 at different positions in the sheet conveyance direction depending on the operating mode of the sheet stacker 10. As the leading end of each sheet P in the sheet conveyance direction contacts the leading end stopper 117 to stack the sheets P on the tray (the fixed tray 115 and the movable tray 116), the sheets P are aligned and stacked on the tray. That is, by regulating the position of the leading end of the sheet P by the leading end stopper 117 in a state in which the sheets P are stacked on the tray, the sheets P are aligned and stacked on the tray.

The sheet stacker 10 provides the operation modes, for example, a stacking mode in which the sheets P are aligned and stacked on the tray without performing the binding process by the stapler 160 and a stapling mode in which the stapler 160 performs the binding process to the sheets P.

In the stacking mode, since the leading end of the sheet P in the sheet conveyance direction may not reach the setting position of the stapler 160, the sheet P is stacked on the movable tray 116 alone. Accordingly, in the stacking mode, the position of the leading end stopper 117 may be located at the tip end of the fixed tray 115, and therefore the leading end stopper 117 is moved to the tip end of the fixed tray 115. By regulating the leading end of the sheet P in the sheet conveyance direction at this position, the sheet P that is conveyed to the sheet stacker 10 is aligned at the position at which the leading end of the sheet P contacts the leading end stopper 117 and is stacked on the movable tray 116.

In the stapling mode, the leading end stopper 117 is moved to the inward side of the fixed tray 115. At this time, the position of leading end stopper 117 represents a position at which the stapler 160 performs the binding process to the leading end of the sheet P in the sheet conveyance direction. When the leading end stopper 117 is located at this position, the sheet P conveyed to the sheet stacker 10 is stacked over the fixed tray 115 and the movable tray 116.

Note that the controller 190 controls the operation to change the position of the leading end stopper 117 according to the operating mode.

The housing 1 is provided with a sheet stack height sensor 170. The sheet stack height sensor 170 is a sensor to detect the height of the upper face of the movable tray 116 or the height of the top face of the bundle of sheets P (sheet media) stacked on the movable tray 116. In a case in which the sheet stack height sensor 170 has detected that the height of the upper face of the movable tray 116 or the height of the top face of the bundle of sheets P stacked on the movable tray 116 is over the predetermined height, the movable tray 116 is lowered to stack so that the sheets P reliably. That is, the movable tray 116 includes a mechanism to move in the Z direction (the vertical direction) based on the detection result of the sheet stack height sensor 170.

The housing 111 is also provided with a sheet entrance detection sensor 180 at the predetermined vertical position. The sheet entrance detection sensor 180 is disposed at the extension of the sheet conveyance passage through which the sheet P is ejected from the image forming apparatus 20. The sheet entrance detection sensor 180 detects that the sheet P is delivered from the image forming apparatus 20 to the sheet stacker 10.

As illustrated in the plan view of FIG. 5, the stacker body 110 has a frame constructed by the housing 111, a frame back side panel 112, a frame front side panel 113, and guide rods 114 in pair. Each guide rod 114 functions as a beam member bridged between the frame back side panel 112 and the frame front side panel 113. The disk unit 120 is movably held with respect to this frame. Note that the guide rod 114 functions as a guide to guide the disk unit 120 when the disk unit 120 moves in the width direction of the sheet P (the Y direction) that is the direction orthogonal to the sheet conveyance direction of the sheet P.

Further, as illustrated in FIG. 5, a plurality of leading end stoppers 117, each regulating the position of the leading end of the sheet P in the sheet conveyance direction, are disposed at the predetermined intervals in the width direction of the sheet P (the Y direction) to be conveyed and stacked on the tray. The plurality of leading end stoppers 117 are aligned at the same positions in the X direction. Note that, after being ejected from the image forming apparatus 20 in the +X direction of the coordinate axes indicated in the drawings, the sheet P is rotated and conveyed by the disk unit 120, and contacts the leading end stopper 117 while the leading end of the sheet P in the sheet conveyance direction directs in the −X direction.

Note that the leading end stoppers 117 are located corresponding to the intervals of the disks 130 described below, so that each disk 130 does not collide the leading end stopper 117 even when each disk 130 is rotated.

The frame back side panel 112 is provided with a first drive motor 118 and a home sensor 119. The first drive motor 118 functions as a drive source that applies a driving force to move the disk unit 120. The home sensor 119 detects that the disk unit 120 is located at the initial position (home position).

Configuration of Disk Unit 120

Next, a detailed description is given of the configuration of the disk unit 120.

Figure 6:
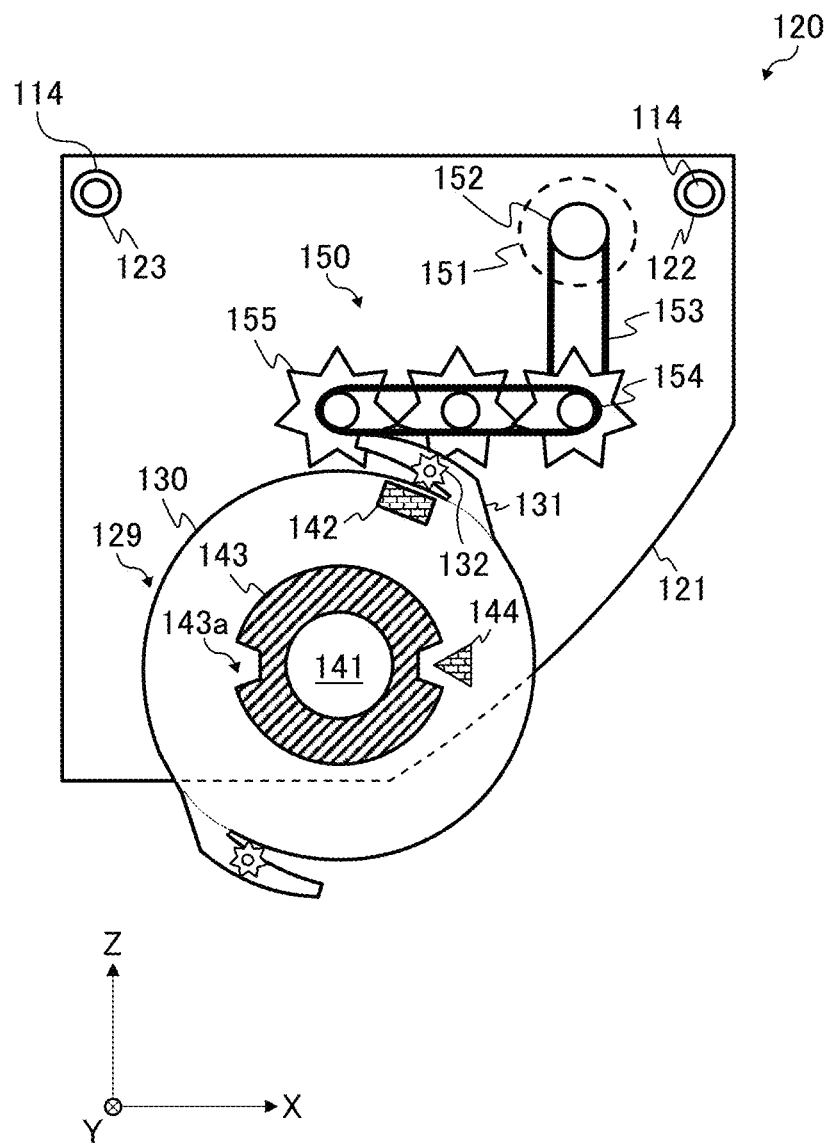
FIG. 6 is a front view illustrating a disk unit included in the sheet stacker of FIG. 3.

FIG. 6 is a front view illustrating the disk unit 120 included in the sheet stacker 10 of FIG. 3.

Figure 7:
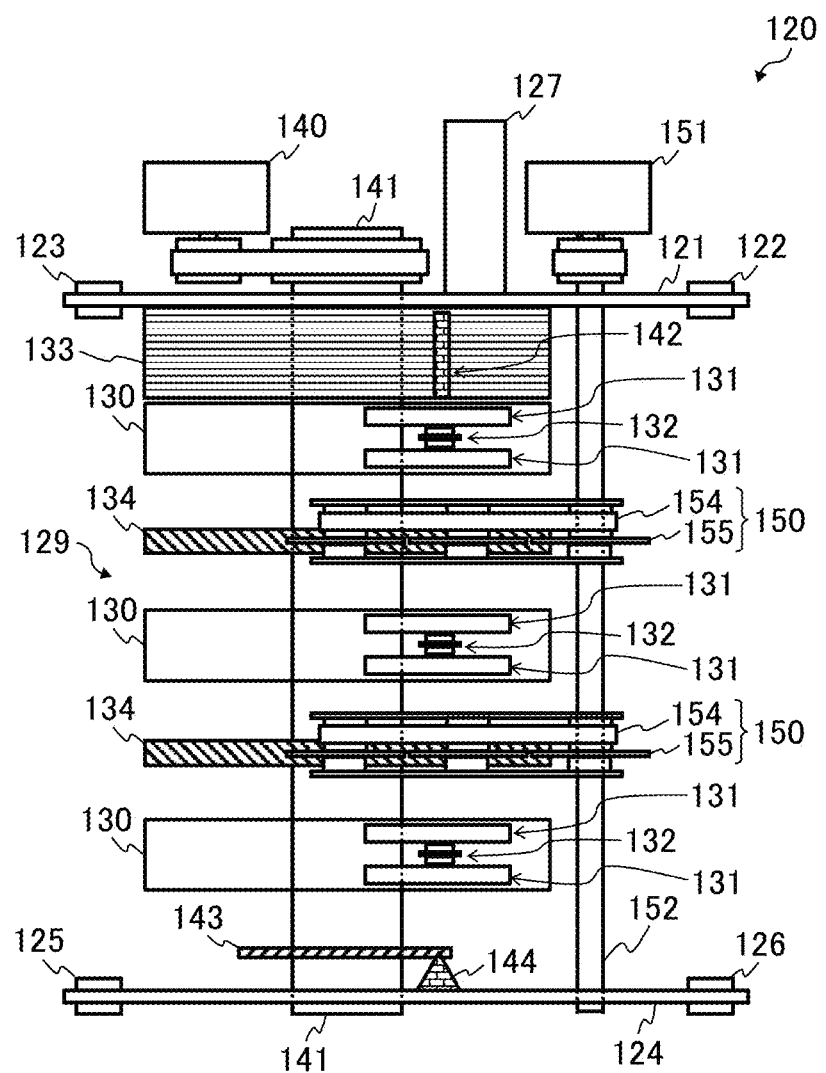
FIG. 7 is a plan view illustrating the disk unit included in the sheet stacker.

FIG. 7 is a plan view illustrating the disk unit 120 included in the sheet stacker 10.

As illustrated in FIG. 6, the disk 130 is a rotary portion. Each disk 130 includes slits 131 to guide the leading end of the sheet P in the sheet conveyance direction to the outer circumference of the disk 130. The slits 131 are provided at the position facing the outer circumferential surface of the disk 130 in the direction of the diameter of the disk 130.

Each slit 131 is provided with a pressing member 132. The pressing member 132 presses the leading end of the sheet P in the sheet conveyance direction against the outer circumferential surface of the disk 130. The leading end of the sheet P in the sheet conveyance direction is gripped (held) by the pressing member 132 and the outer circumferential surface of the disk 130. That is, the pressing member 132 is a spur wheel to fix (hold), e.g., the leading end of the sheet P in the sheet conveyance direction to the outer circumferential surface of the disk 130 when the sheet P is guided to the slit 131. Note that the fixing force of the sheet P applied by the pressing member 132 to fix the sheet P is the substantially same amount of force to prevent the sheet P from coming off from the disk 130 in the holding state, due to a force to receive, e.g., the centrifugal force applied to the sheet P by rotation of the disk 130, the stiffness of the sheet P, air resistance, and the force to receive wind (air) blown by the air conditioning. The slit 131 and the pressing member 132 construct a leading end holder (first holder) that is included in the medium holder to hold the leading end of the sheet P on the outer circumferential surface of the disk 130. Further, the slit 131 and the pressing member 132 are included in a pressing mechanism to press the leading end of the sheet P against the outer circumferential surface of the disk 130. Note that the pressing member 132 included in the pressing mechanism is a spur wheel that functions as a rotary body. However, the rotary body is not limited to a spur wheel but may be a rotary body that has the substantially same size of the contact area to contact the sheet P, as the contact area of the spur wheel and that ally contacts the sheet P. For example, the rotary body may be an abrasive roller having an abrasive surface.

Further, as described below, the fixing force of the sheet P applied by the pressing member 132 is the amount of force to cause the leading end of the sheet P held by the disk 130 in the sheet conveyance direction to contact the leading end stopper 117 and, when the disk 130 further rotates in the holding state, cancel the holding state.

Further, as illustrated in FIG. 6, the disk unit 120 includes a rotary shaft 141, a phase detection disk 143 and a phase detection sensor 144. The rotary shaft 141 is rotatably held by a back side panel 121 and a front side panel 124 (see below). The phase detection disk 143 functions as a phase detector to detect the phase of the disk 130. The phase detection sensor 144 detects the rotation state of the phase detection disk 143.

Further, as illustrated in FIG. 6, the medium position retainer 150 is disposed above the disk 130, so that the medium position retainer 150 holds the position of the sheet P, with the leading end of the sheet P being held by the outer circumferential surface of the disk 130, when the sheet P is conveyed. The details of the medium position retainer 150 are described below.

Further, as illustrated in FIGS. 6 and 7, the disk unit 120 is provided with a rotation-conveyance mechanism of the sheet P. The rotation-conveyance mechanisms are disposed between the back side panel 121 and the front side panel 124, at predetermined intervals, in the Y direction that is orthogonal to the X direction that is the sheet conveyance direction of the sheet P. The rotation-conveyance mechanism includes a plurality of disks 130 and a plurality of medium position retainers 150, as the main configuration.

The back side panel 121 includes a first back side guide 122 and a second back side guide 123 at both ends in the X direction. Further, the front side panel 124 includes a first front side guide 126 and a second front side guide 125 at both ends in the X direction.

The first back side guide 122 and the first front side guide 126 construct a pair of guides, and the second back side guide 123 and the second front side guide 125 construct another pair of guides. The first back side guide 122 and the second back side guide 123 pass through the back side panel 121 in the thickness direction. The first front side guide 126 and the second front side guide 125 pass through the front side panel 124 in the thickness direction. One of the guide rods 114 in pair (i.e., one of the pair of guide rods 114) included in the stacker body 110 passes through the first back side guide 122 and the first front side guide 126. The other of the guide rods 114 in pair (i.e., the other of the pair of guide rods 114) included in the stacker body 110 passes through the second back side guide 123 and the second front side guide 125. The disk unit 120 has a frame including the back side panel 121, the front side panel 124, the rotary shaft 141, and a spur wheel drive shaft 152 (see below). The frame of the disk unit 120 is held by the frame of the stacker body 110 and is movable in the Y direction by the pair of guide rods 114.

Further, as illustrated in FIG. 7, a rack 127 is on the outer side of the back side panel 121. The rack 127 is disposed to mesh with a gear that is mounted on the rotary shaft of the first drive motor 118 that is mounted on the housing 111. Accordingly, with the rotation of the rotary shaft of the first drive motor 118, the rack 127 generates the moving force in the Y direction, so that the whole disk unit 120 moves in the Y direction as a whole. Note that, as the home sensor 119 (see FIG. 5) detects the position of the rack 127, the controller 190 determines the position and amount of movement (amount of shift) of the disk unit 120.

Configuration of Disk 130

As illustrated in FIG. 7, the disks 130 included in the rotary portion 129 are disposed and fixed at the predetermined intervals to the rotary shaft 141 that is rotatably held between the back side panel 121 and the front side panel 124. Rotation of the rotary shaft 141 is adjusted by a second drive motor 140 that is held by the back side panel 121. The operation of the second drive motor 140 is controlled by the controller 190. Accordingly, the controller 190 controls rotation of the disk 130.

Note that the number of the disks 130 and the alignment of the disks 130 to the rotary shaft 141 are not limited to the configuration example illustrated in FIG. 7. As described below, the disk 130 may include a rotary portion that rotates while holding the sheet P on the outer circumferential surface and conveys the sheet P in the predetermined direction. As long as the disk 130 is capable of rotating while holding the sheet P and conveying the sheet P in the predetermined direction, the shape of the disk 130 is not limited to the disc shape as illustrated in FIG. 7. For example, a pair of cylindrical members may be disposed at both ends of the rotary shaft 141. That is, the disk 130 may have a configuration to rotate while holding the sheet P on the outer circumferential surface and convey the sheet P in the rotational direction. Further, the disk 130 may have a configuration to hold the sheet P in the width direction of the sheet P so that the position of the sheet P in configuration is not distorted when rotating and conveying the sheet P.

Further, as illustrated in FIG. 7, the disk unit 120 includes a sheet conveyance guide 133 that is positioned by the rotary shaft 141 and fixed to the back side panel 121. The sheet conveyance guide 133 is provided with an image sensor 142 that detects the leading end and side end (end portion in the direction orthogonal to the sheet conveyance direction) of the sheet P that is ejected from the image forming apparatus 20. The image sensor 142 functions as a medium side detector to detect the position of the side end of the sheet P, so that the image sensor 142 reads the lateral registration of the sheet P. Then, based on the position of the side end of the sheet P, detected by the image sensor 142, the controller 190 calculates the amount of movement in the Y direction to move the sheet P conveyed by the disk 130 to the stacking position. The controller 190 causes the first drive motor 118 to move the disk unit 120 to the predetermined position according to the amount of movement calculated by the controller 190. By so doing, even if the sheet P is conveyed while being deviated in the sheet conveyance direction, the sheet P is stacked at the predetermined position.

The phase detection disk 143 is fixed to a position near one end of the rotary shaft 141. As illustrated in FIG. 6, the phase detection disk 143 includes a disc-shaped member having notches 143a in parts on the circumferential surface. The notches 143a are provided at respective positions facing each other in the diameter direction of the phase detection disk 143. As the phase detection sensor 144 detects the notches 143a, the phase of the disk 130 is detected.

Note that, as illustrated in FIG. 6, when one of the notches 143a is located at the setting position of the phase detection sensor 144, the disk 130 is in a state ready to receive the sheet P. Since the disk 130 is fixed to the rotary shaft 141, as the phase of the rotary shaft 141 is detected, the state of the disk 130 is detected.

Further, as illustrated in FIG. 7, idling disks 134 are rotatably attached to the rotary shaft 141. Each idling disk 134 is disposed between the adjacent disks 130 spaced apart at the predetermined interval, in the axial direction of the rotary shaft 141. The outer circumferential surface of each idling disk 134 is located at the position corresponding to the outer circumferential surface of the spur wheel group 155 included in the medium position retainer 150.

The medium position retainer 150 is a retaining mechanism that prevents the sheet P, while the leading end of the sheet P in the sheet conveyance direction is retained by the disk 130, from coming off from the outer circumferential surface of the disk 130 due to, e.g., the centrifugal force applied to the sheet P by rotation of the disk 130, the stiffness of the sheet P, air resistance, and the force to receive wind (air) blown by the air conditioning. The medium position retainer 150 functions as a medium holder. As illustrated in FIG. 6, the medium position retainer 150 mainly includes the spur wheel group 155 and a coupling drive belt 154. The spur wheel group 155 includes a plurality of spur wheels integrally in the sheet conveyance direction. Respective spur wheels of the spur wheel group 155 rotate separately. The coupling drive belt 154 drives the respective spur wheels of the spur wheel group 155 simultaneously at the same speed. The spur wheel group 155 corresponds to a rotary body group including a plurality of spur wheels functioning as a plurality of rotary bodies that partly contact the sheet P.

Medium Position Retainer 150

Here, a detailed description is given of the configuration of the medium position retainer 150, with reference to FIG. 6 mainly. The spur wheel group 155 included in the medium position retainer 150 is provided with the plurality of spur wheels in the sheet ejection direction (the X direction) of the sheet P that is ejected from the image forming apparatus 20. The leading spur wheel (that is, the most distal spur wheel from the sheet entrance port of the sheet P in the housing 111) of the spur wheel group 155 is disposed farther than the spur wheel facing the top of the outer circumference of the disk 130 that is included in the rotary portion, from the sheet entrance port of the sheet P in the housing 111. This configuration enhances the effect to reliably revere the trailing end of the sheet P in the sheet conveyance direction while the sheet P is conveyed by the spur wheel group 155 and stack the sheet P on the tray.

Further, the rotary shaft of the leading spur wheel is rotated by the spur wheel drive belt 153 according to rotation of the spur wheel drive shaft 152. The spur wheel drive shaft 152 is bridged between the back side panel 121 and the front side panel 124 so that the spur wheel drive motor 151 supported by the back side panel 121 rotates the spur wheel drive shaft 152.

The controller 190 controls the operation of the spur wheel drive motor 151. Accordingly, the controller 190 controls rotation of the spur wheel drive motor 151 according to the predetermined timing (for example, the timing at which the sheet entrance detection sensor 180 detected the leading end of the sheet P). That is, rotation of the spur wheel group 155 is controlled according to the sheet entrance timing of the sheet P.

Of the spur wheels of the spur wheel group 155 of the medium position retainer 150, the spur wheel disposed facing the outer circumferential surface of the disk 130 at the top of the disk 130 prevents the sheet P held on the outer circumferential surface of the disk 130 at the top of the disk 130, from moving in the direction to come off from the disk 130. Therefore, this spur wheel presses a part of the sheet P (that is, the part of the sheet P facing the outer circumferential surface of the disk 130 at the top of the disk 130, in particular, at the trailing end of the sheet P in the sheet conveyance direction), against the outer circumference of the disk 130. Note that the drive source of the spur wheel group 155 is different from the drive source of the disk 130. Accordingly, the rotational speed of the spur wheel group 155 is controllable separate from the outer rotational speed of (the outer circumferential surface of) the disk 130. The rotational speed of the spur wheel group 155 may be equal to or greater than the rotational speed of the disk 130, as described below, so that conveyance of the sheet P that contacts each spur wheel of the spur wheel group 155 is not hindered. That is, the conveyance speed of the sheet P conveyed by the spur wheel group 155 may be equal to or greater than the conveyance speed of the sheet P conveyed by the disk 130.

Hardware Configuration of Controller 190

Next, a description is given of the controller 190 that controls the operation of the sheet stacker 10.

Figure 8:
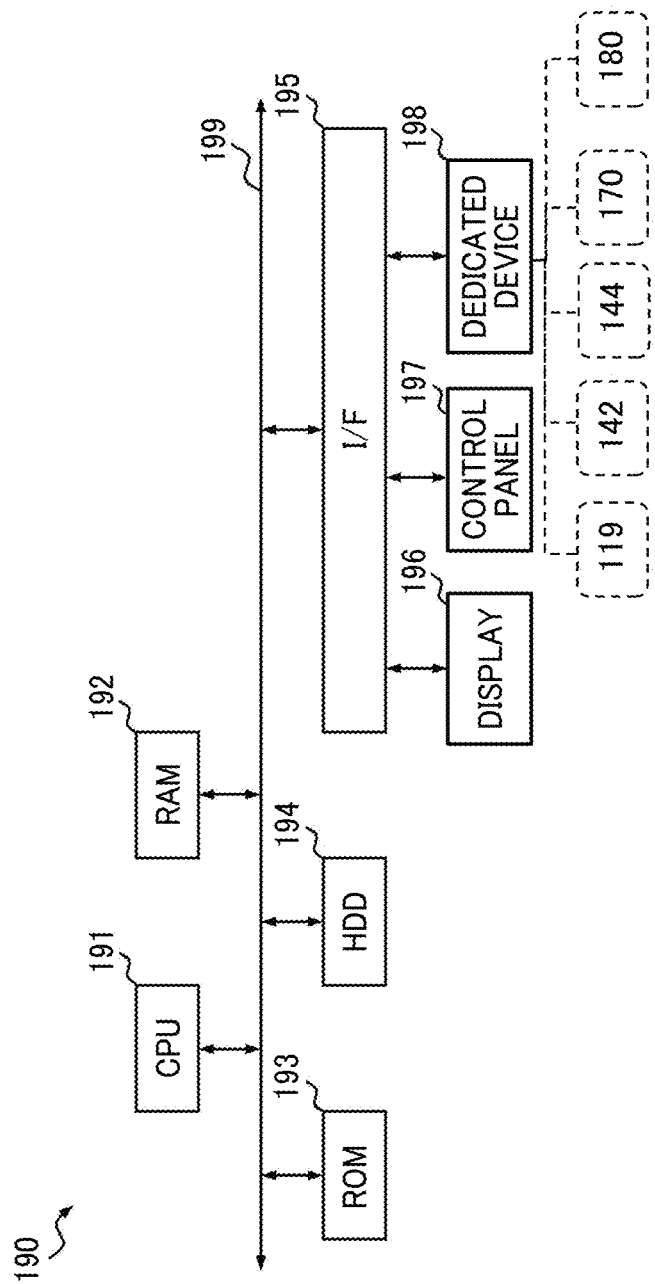
FIG. 8 is a diagram illustrating hardware configuration of a controller included in the sheet stacker.

FIG. 8 is a diagram illustrating the hardware configuration of the controller 190 included in the sheet stacker 10.

FIG. 8 includes the same configuration as the hardware configuration of a general information processing device. In the hardware configuration of the controller 190 according to the present embodiment, a central processing unit (CPU) 191, a random access memory (RAM) 192, a read-only memory (ROM) 193, a hard disk drive (HDD) 194, and an interface (I/F) 195 are connected via a bus 199. Further, a display 196, a control panel 197, and a dedicated device 198 are connected to the I/F 195.

The CPU 191 is a calculation unit and controls the whole operation of the entire sheet stacker 10. The RAM 192 is a volatile storage medium that allows data to be read and written at high speed. The CPU 191 uses the RAM 192 as a work area for data processing. The ROM 193 is a read-only non-volatile storage medium that stores programs such as firmware. The HDD 194 is a non-volatile storage medium that allows data to be read and written and has a relatively large storage capacity. The HDD 194 stores, e.g., an operating system (OS), various control programs, and application programs. The various control programs include the medium conveyance control program and the post-processing control program.

The I/F 195 connects various kinds of hardware or networks to the bus 199, and controls the operations performed between the bus 199 and the various hardware and networks. The display 196 is a visual user interface through which a user checks the status of the sheet stacker 10 and the set operation mode. The display 196 includes a display unit such as a liquid crystal display (LCD). The control panel 197 is a user interface through which a user inputs the setting of the operation mode of the sheet stacker 10.

The dedicated device 198 is a hardware to achieve the function to perform the operation dedicated to the sheet stacker 10 and may include the sensors, for example, the sheet entrance detection sensor 180, the sheet stack height sensor 170, the home sensor 119, the image sensor 142, and the phase detection sensor 144.

The controller 190 includes a software controller to achieve the predetermined function using the hardware configuration included in the dedicated device 198 to read out the program stored in the ROM 193 or the HDD 194 to the RAM 192 to be executed by the CPU 191.

Functional Blocks of Controller 190

Figure 9:
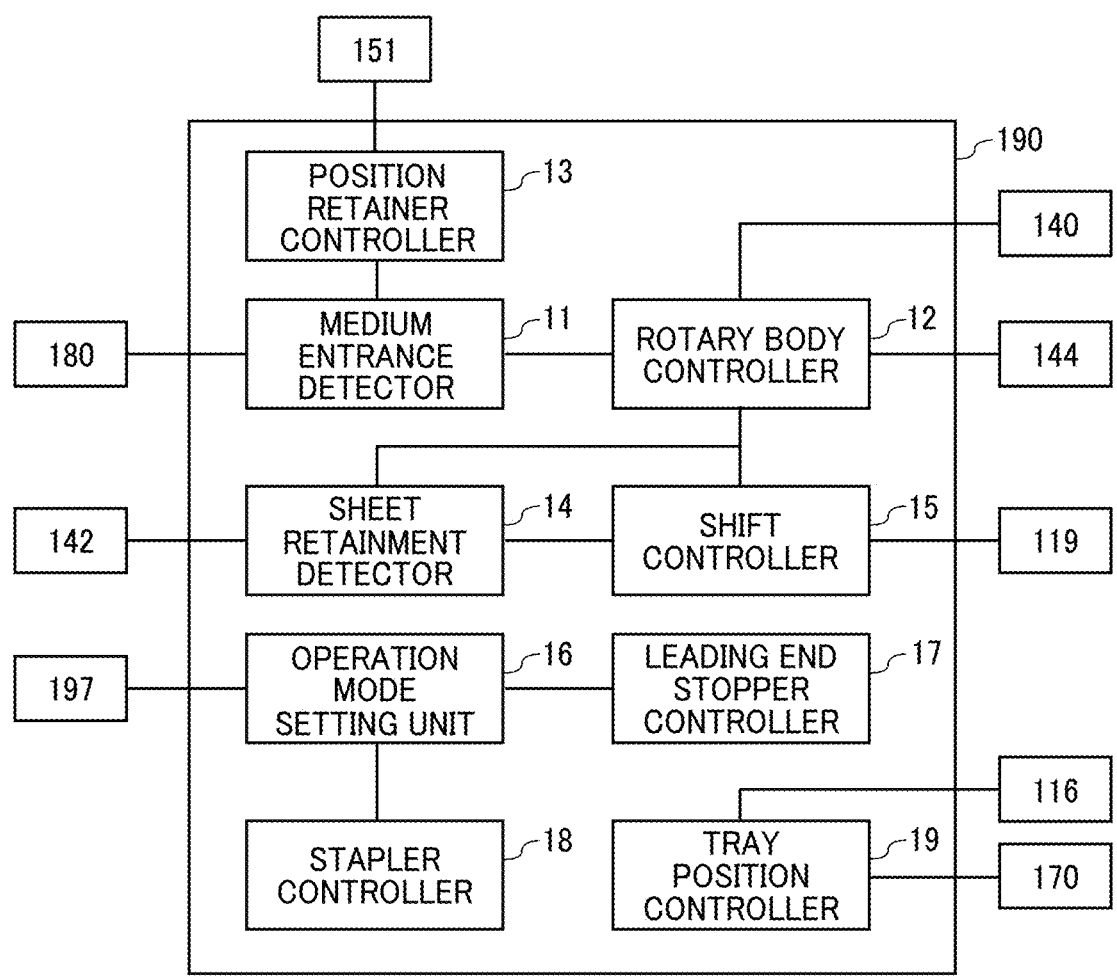
FIG. 9 is a functional block diagram illustrating the functional configuration of the controller of the sheet stacker.

FIG. 9 is a functional block diagram illustrating the functional block configuration of the controller 190 of the sheet stacker 10 according to the present embodiment.

Each function block is achieved by cooperation of the control program executed by the controller 190 and the hardware configuration illustrated in FIG. 8. The controller 190 includes a medium entrance detector 11, a rotary body controller 12, a position retainer controller 13, a sheet retainment detector 14, a shift controller 15, an operation mode setting unit 16, a leading end stopper controller 17, a stapler controller 18, and a tray position controller 19.

The medium entrance detector 11 determines that the leading or trailing end of the sheet P in the sheet conveyance direction is detected based on the output of the sheet entrance detection sensor 180, and notifies the determination result to the rotary body controller 12 and the position retainer controller 13.

The rotary body controller 12 controls the driving force of the second drive motor 140 based on the notification from the medium entrance detector 11. For example, the second drive motor 140 is controlled to start rotating the disk 130, after the sheet entrance detection sensor 180 detects the leading end of the sheet P in the sheet conveyance direction and then the sheet retainment detector 14 described below detects the leading end of the sheet P in the sheet conveyance direction. By so doing, after the sheet P is received by the sheet stacker 10 and the leading end of the sheet P in the sheet conveyance direction is held by the disk 130, the disk 130 rotates, so that the sheet P is rotated and conveyed.

In addition, the rotary body controller 12 determines the number of rotations of the disk 130 based on the detection result of the notch 143*a* detected by the phase detection sensor 144, and controls the amount of conveyance of the leading end of the sheet P by the second drive motor 140 based on the determination result. That is, the rotary body controller 12 controls the amount of conveyance of the leading end of the sheet P conveyed by the disk 130.

In addition, the rotary body controller 12 temporarily stops rotation of the disk 130 based on the number of rotations of the disk 130 determined based on the detection result of the notch 143*a* detected by the phase detection sensor 144, and notifies that the disk 130 is temporarily stopped, to the shift controller 15.

The position retainer controller 13 controls rotation of the spur wheel group 155 included in the medium position retainer 150, based on the notification from the medium entrance detector 11. For example, the position retainer controller 13 causes the spur wheel drive motor 151 to start rotating the spur wheel group 155 when the sheet entrance detection sensor 180 detects the leading end of the sheet P in the sheet conveyance direction. In addition, the position retainer controller 13 stops rotation of the spur wheel drive motor 151 to temporarily stop the operation of the spur wheel group 155, based on the notification from the medium entrance detector 11, in a case in which the shift operation of the disk unit 120 is not completed when the trailing end of the sheet P in the sheet conveyance direction passed the sheet entrance detection sensor 180.

The sheet retainment detector 14 detects that the leading end in the sheet conveyance direction of the sheet P ejected from the image forming apparatus 20 and received by the sheet stacker 10 is guided to the slit 131, based on the output of the image sensor 142. As the leading end of the sheet P in the sheet conveyance direction is guided to the slit 131, the sheet P is held by the pressing member 132 (spur wheel) and the outer circumferential surface of the disk 130. Therefore, as the disk 130 and the spur wheel group 155 rotate, the sheet P is conveyed while the sheet P is wound around the outer circumferential surface of the disk 130 or while two positions of the sheet P in the sheet conveyance direction are held by the pressing member 132 and the spur wheel group 155.

In response to the notification (that rotation of the disk 130 is temporarily stopped) from the rotary body controller 12, the shift controller 15 controls the operation of the first drive motor 118. Rotation of the first drive motor 118 shifts the disk unit 120 to the predetermined direction. Note that the shift controller 15 may start the shift operation by rotating the first drive motor 118 before the rotation of the disk 130 stops, based on the elapsed time from the detection of the leading end of the sheet P in the sheet conveyance direction detected by the sheet retainment detector 14.

The operation mode setting unit 16 sets the operation mode of the sheet stacker 10 based on the operation mode indicated by a user via the control panel 197. As described above, the operation modes include the stacking mode and the stapling mode. The operation mode setting unit 16 notifies the operation mode set by a user via the control panel 197, to the leading end stopper controller 17 and the stapler controller 18.

When receiving notification from the operation mode setting unit 16 that the stacking mode is set, the leading end stopper controller 17 moves the leading end stopper 117 to the tip end of the fixed tray 115. On the other hand, when receiving notification from the operation mode setting unit 16 that the stapling mode is set, the leading end stopper 117 moves leading end stopper 117 to the proximal side of the fixed tray 115 so that the leading end of the sheet P in the sheet conveyance direction reaches the binding position of the stapler 160.

When receiving notification from the operation mode setting unit 16 that the stapling mode is set, after the sheets P for one print job are respectively conveyed in a state in which the leading end in the sheet conveyance direction is regulated and aligned by the leading end stopper 117 according to the predetermined conveyance operation, the stapler controller 18 performs the binding operation. After the binding operation is completed, the stapler controller 18 moves the leading end stopper 117 in the sheet conveyance direction to move the sheet P from the top of the fixed tray 115 to stack the sheet P on the movable tray 116 alone. Then, the stapler controller 18 moves the leading end stopper 117 to the stapling position.

When the sheet stack height sensor 170 detects that the height of the upper face of the movable tray 116 or the height of the upper face of the sheet P on top of the bundle of sheets P stacked on the movable tray 116 has reached the predetermined height, the tray position controller 19 controls to lower the movable tray 116 by the predetermined amount of height. In the stapling mode, after completion of the binding operation, after moving the leading end stopper 117 in the sheet conveyance direction and stacking the sheet P on the movable tray 116 alone, the tray position controller 19 controls the movable tray 116 to lower by the predetermined amount of height.

A known inkjet printer avoids stacking a sheet onto the stacking portion while contacting the sheet with friction with other sheets that have been stacked and stacked on the stacking portion when stacking the sheet on the stacking portion. However, it is unavoidable that sheets contact with each other with friction in the stacking portion when stacking the sheet at different positions for each job or when aligning the position in the width direction of the sheet when the sheet is conveyed at a different position deviated in a direction orthogonal to the sheet conveyance direction.

In particular, in a case in which an image is formed on the sheet with liquid material, depending on the dry condition of the image part of the sheet, the sheet is warped to generate the positional deviation easily when the sheet is stacked. Therefore, when the sheets are stacked and then aligned, the image formed portion of the sheet contacts the other sheet with friction, resulting in image distortion of the image on the sheet. That is, such a known inkjet printer has some issues to be solved in enhancing the stability in quality when stacking the sheet-like recording medium on which an image is formed, in particular, with liquid material and in maintaining the image quality formed on the sheet-like recording medium.

Further, when stacking the sheet-like recording medium or media, the sheet-like recording media are stacked while the reverse conveyance portion holding only the leading end of the sheet-like recording medium, and therefore it is likely to disturb the stacking state of the sheet-like recording media.

According to the controller 190 having the above-described configuration, the sheet P is rotated to convey and is shifted to the alignment position while being promoted to dry. Therefore, the sheet P is stacked so that the faces with liquid being attached do not contact with friction. Further, according to the controller 190 having the above-described configuration, the leading end of the sheet P in the sheet conveyance direction is shifted to the alignment position, while the sheet P is held at a plurality of positions in the direction orthogonal to the sheet conveyance direction of the sheet P and the inclination (skew) of the sheet P and the positional deviation of the sheet P in the direction orthogonal to the sheet conveyance direction are corrected. Further, by rotating and conveying the sheet P, even if the sheet P is warped, the curve of the sheet P is corrected to stack the sheet P on the tray. That is, a stable alignment quality is achieved regardless of the state of the sheet P.

Operation of Sheet Stacker 10

Figure 10:
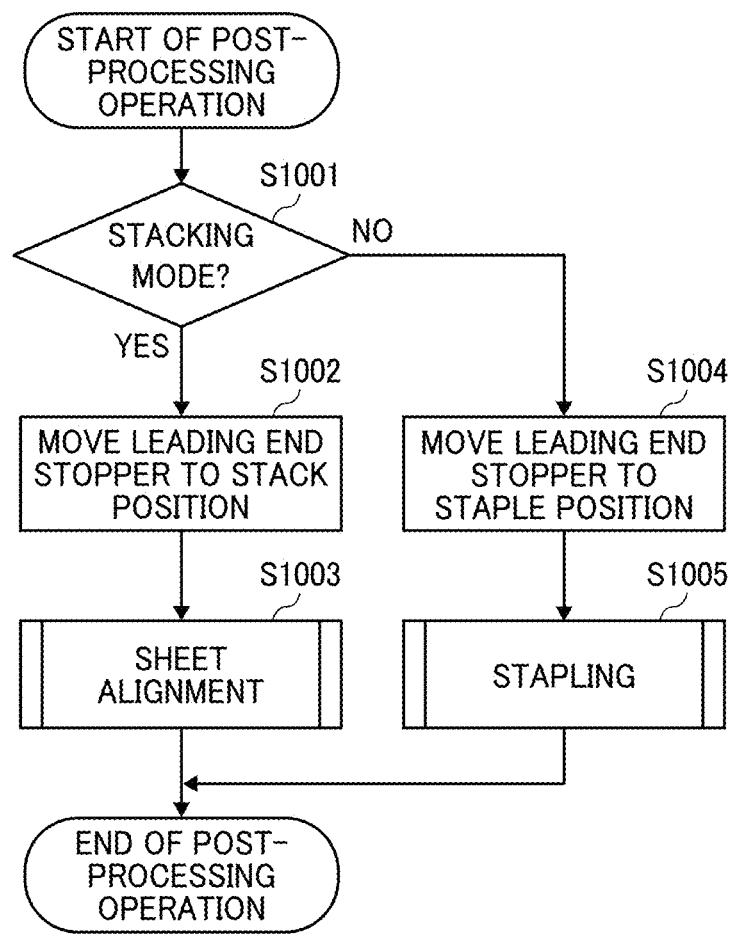
FIG. 10 is a flowchart illustrating the flow of operations performed in the sheet stacker.

Next, a description is given of the flow of the post-processing operation performed in the sheet stacker 10, with reference to the flowchart of FIG. 10.

FIG. 10 is a flowchart illustrating the flow of operations performed in the sheet stacker 10.

The state of the sheet stacker 10 at the start of the operation is the state of the sheet stacker 10 of FIGS. 2 and 3. That is, when starting the operation, the sheet stacker 10 is in the state in which the disk unit 120 stands by at the frame back side panel 112 as the home position and in the state in which the rotary shaft 141 is stopped while the position of the phase detection sensor 144 corresponds to the position of the notch 143a. In other words, the state in which the sheet P is received from the image forming apparatus 20 and the disk 130 is located at the position at which the leading end of the sheet P passes between the upper face of the outer circumference of the disk 130 and the spur wheel group 155 to enter the slit 131 is the initial state of the sheet stacker 10 at the start of the operation.

When the sheet stacker 10 is operated, a user firstly sets the operation mode via the control panel 197. Therefore, it is determined whether or not the operation mode set at the start of the operation is the stacking mode (step S1001).

When the operation mode is the stacking mode (YES in step S1001), the leading end stopper 117 is moved to the stack position (step S1002). The stack position indicates the position in the state in which the leading end stopper 117 is disposed at the distal end of the fixed tray 115, that is, the state in which the leading end of the conveyed sheet P contacts the leading end stopper 117 disposed at the distal end of the fixed tray 115 to align the leading end of the sheet P and then stack the sheet P on the movable tray 116 alone.

After the leading end stopper 117 has been moved to the stack position, the sheet alignment operation is started (step S1003). The details of the sheet alignment operation (step S1003) is described below.

In step S1001, when the operation mode is the stapling mode (NO in step S1001), the leading end stopper 117 is moved to the staple position (step S1004). The staple position indicates the position in the state in which the leading end stopper 117 is moved inward from the distal end of the fixed tray 115, that is, the state in which the stapler 160 performs the binding operation to the end of the sheet P.

After the leading end stopper 117 has been moved to the staple position, the stapling operation is started (step S1005). The details of the stapling operation (step S1005) is described below.

Sheet Alignment Operation

Figure 11:
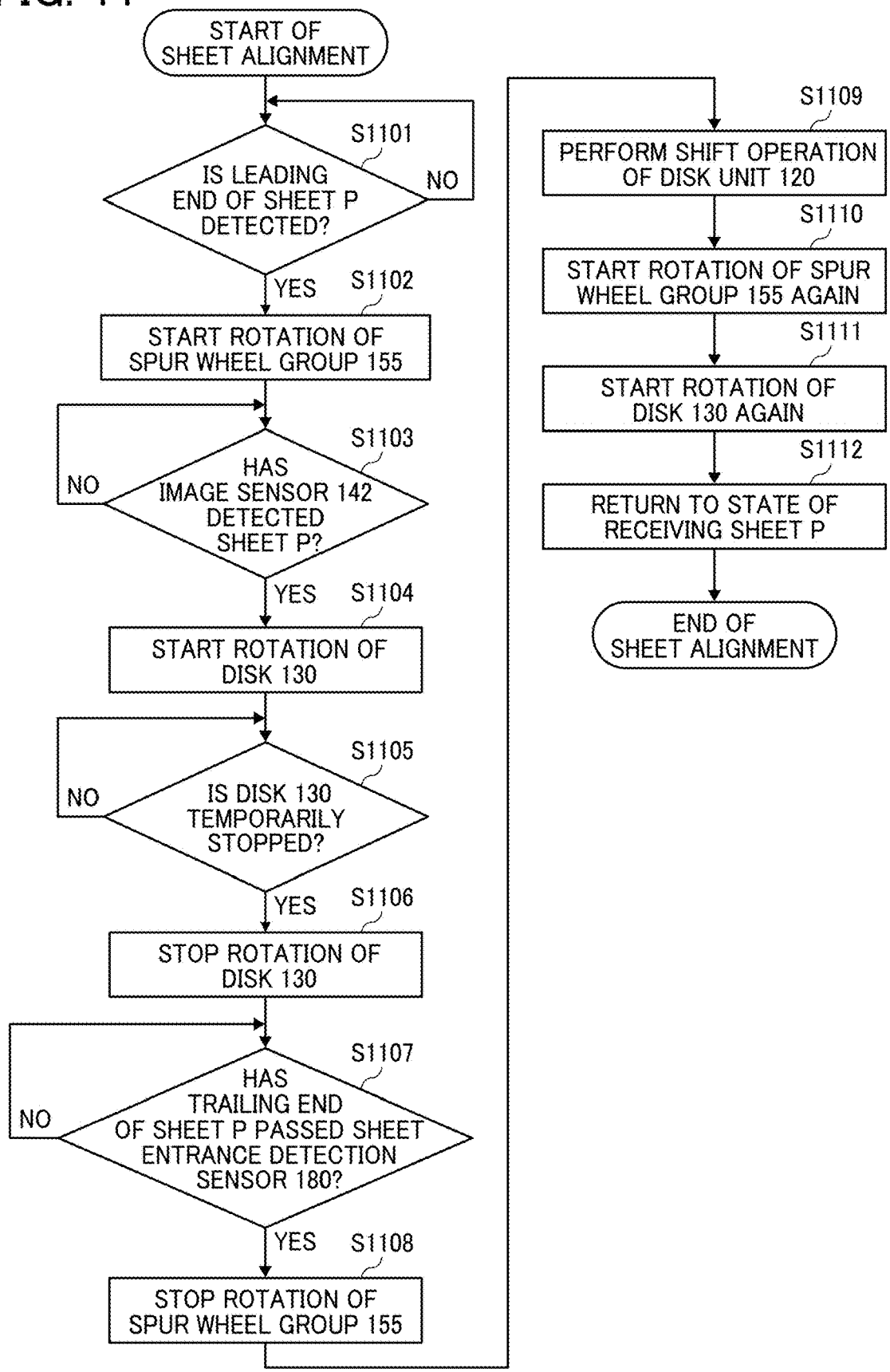
FIG. 11 is a flowchart illustrating the flow of a sheet stacking process executed in the sheet stacker.

Next, a description is given of a series of operations performed by the sheet stacker 10 that executes the sheet alignment operation, with reference to the flowchart of FIG. 11 and the drawings of FIGS. 12A to 15B.

Note that, in the drawings of FIGS. 12A to 15B, FIGS. 12A, 13A, 14A, and 15A are plan views illustrating the sheet stacker 10, and FIGS. 12B, 13B, 14B, and 15B are front views illustrating the sheet stacker 10.

First, the controller 190 monitors whether the sheet entrance detection sensor 180 detects (the leading end of) the conveyed sheet P having the image formed in the image forming apparatus 20 (step S1101).

When the sheet entrance detection sensor 180 has not detected (the leading end of) the sheet P (NO in step S1101), the operation in step S1101 is repeated until the sheet entrance detection sensor 180 detects (the leading end of) the sheet P.

Figure 12A:
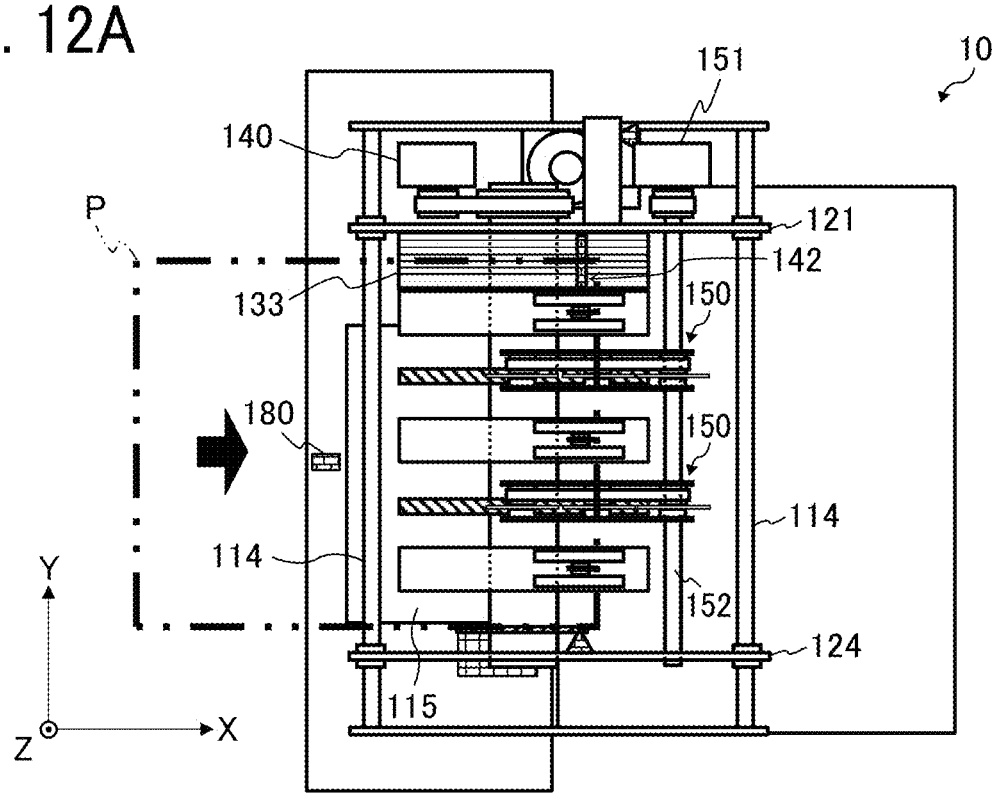
FIGS. 12A and 12B are diagrams each illustrating an operation of the sheet stacking process executed in the sheet stacker.
Figure 12B:
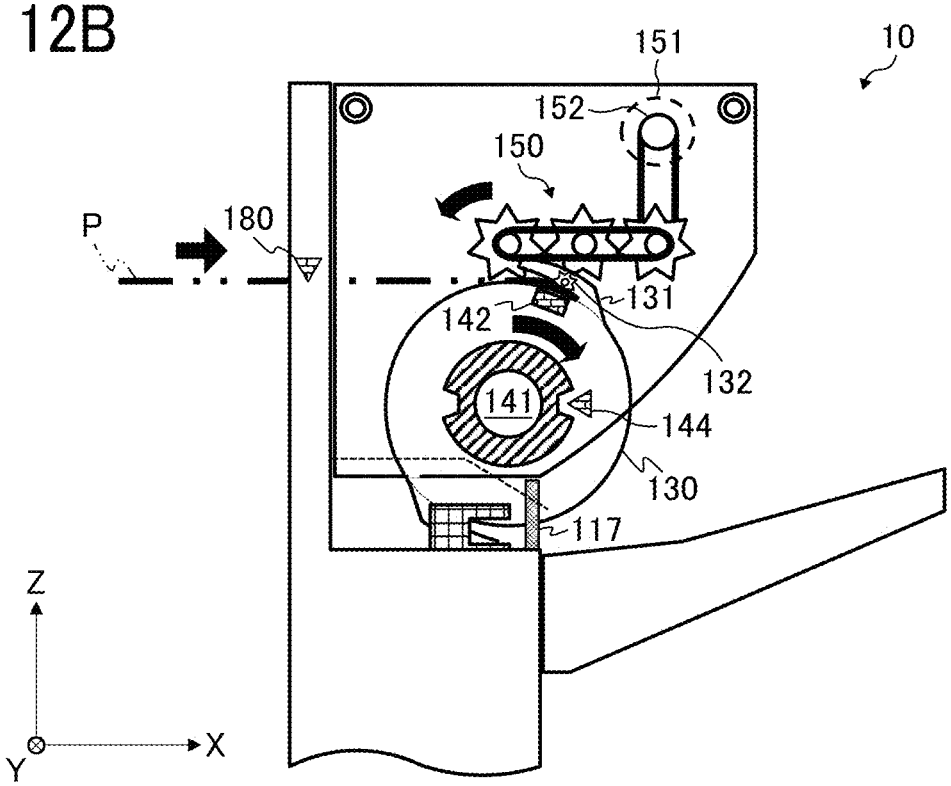

When the sheet entrance detection sensor 180 has detected (the leading end of) the sheet P (YES in step S1101), as illustrated in FIG. 12B, the spur wheel drive motor 151 is driven to rotate the spur wheel group 155 included in the medium position retainer 150 (step S1102). With the above-described action of the spur wheel drive motor 151, the spur wheel group 155 starts rotating.

As the spur wheel group 155 rotates, as illustrated in FIGS. 12A and 12B, the sheet P moves in the sheet conveyance direction (the X direction) while mainly the leading end of the sheet P is pressed between the spur wheels and the idling disks 134, so that the sheet P is guided to the slit 131 to reach the position at which the sheet P is held between the pressing member 132 and the disk 130. At this time, the leading and side ends of the sheet P are detected by the image sensor 142. That is, it is determined whether the image sensor 142 detects the leading and side ends of the sheet P (step S1103).

When the image sensor 142 has not detected the sheet P (NO in step S1103), the sheet P continues to move in the slit 131 until the leading and side ends of the sheet P are detected by the image sensor 142.

When the image sensor 142 has detected the leading end of the sheet P (YES in step S1103), the leading end of the sheet P is held between the pressing member 132 and the outer circumferential surface of the disk 130 in the slit 131. That is, the leading end of the sheet P is held on the outer circumferential surface of the disk 130 that functions as a rotary body.

Then, as illustrated in FIGS. 12A and 12B, the second drive motor 140 is driven to rotate the disk 130 (step S1104). At this time, since the spur wheel group 155 holds the sheet P while rotating, the sheet P held on the outer circumference surface of the disk 130 is prevented from moving in the direction to come off from the outer circumferential surface of the disk 130 due to, e.g., the centrifugal force applied to the sheet P by rotation of the disk 130, the stiffness of the sheet P, air resistance, and the force to receive wind (air) blown by the air conditioning. By so doing, the sheet P remains to be held on the disk 130, and therefore is conveyed along rotation of the disk 130.

Figure 13A:
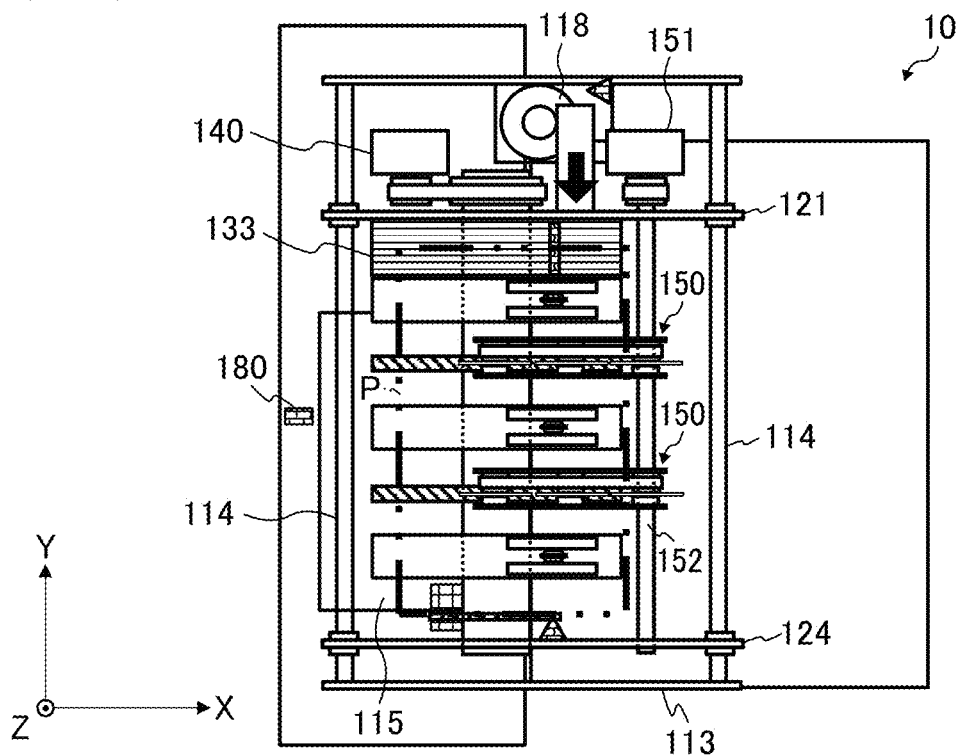
FIGS. 13A and 13B are diagrams each illustrating another operation of the sheet stacking process executed in the sheet stacker.
Figure 13B:
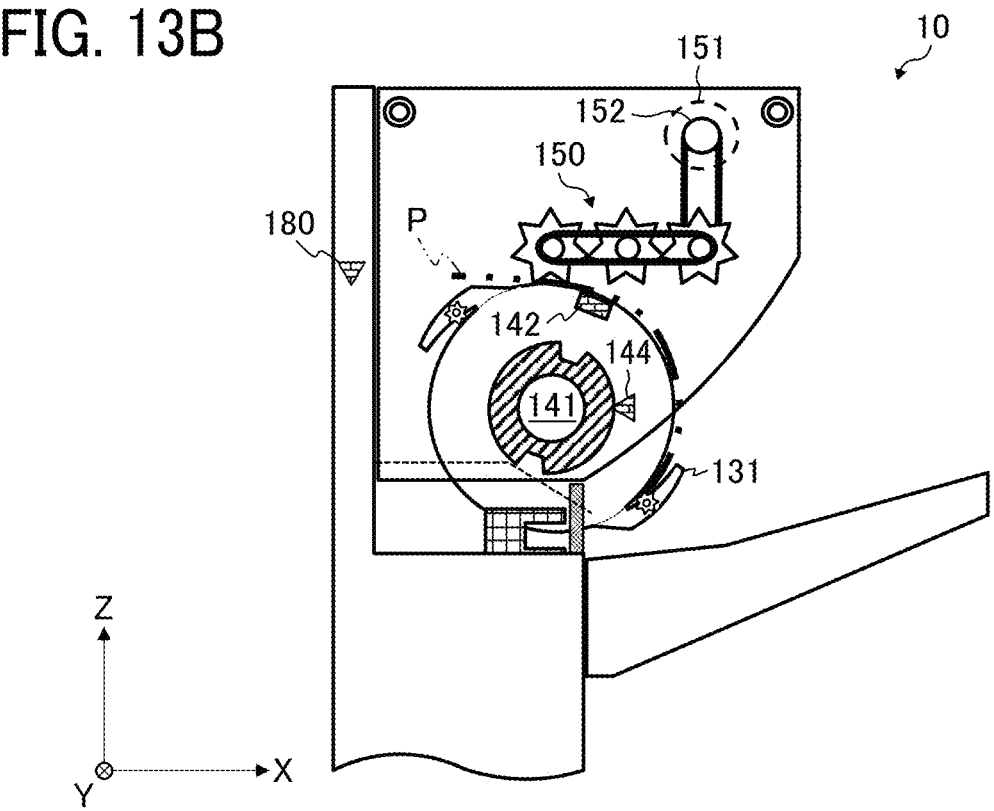

Next, it is determined whether or not the disk 130 rotates to move the slit 131 to the position indicated in FIG. 13B, based on the detection result of the phase detection sensor 144 (step S1105). The rotation state of the disk 130 indicated in FIG. 13B is referred to as a temporary stop state.

When the disk 130 has not come to the temporary stop state, in other words, when the disk 130 has not rotated to move the slit 131 to reach the position in the temporary stop state (NO in step S1105), the disk 130 continues to rotate until the slit 131 reaches the position in the temporary stop state.

When the disk 130 has come to the temporary stop state (YES in step S1105), the controller 190 controls the operation of the second drive motor 140 to cause the disk 130 to stop rotating at the position (step S1106).

Then, it is determined whether or not the trailing end of the sheet P in the sheet conveyance direction has passed the sheet entrance detection sensor 180 (step S1107).

When the trailing end of the sheet P in the sheet conveyance direction has not passed the sheet entrance detection sensor 180 (NO in step S1107), the medium position retainer 150 (the spur wheel group 155) continues the rotation.

On the other hand, when the trailing end of the sheet P in the sheet conveyance direction has passed the sheet entrance detection sensor 180 (YES in step S1107), the medium position retainer 150 (the spur wheel group 155) stops rotating (step S1108).

Then, as illustrated in FIG. 13A, the controller 190 causes the first drive motor 118 to rotate so as to move the disk unit 120 to the frame front side panel 113 by the predetermined amount and to stop the disk unit 120 at the position (step S1109). By performing this shift operation of the disk unit 120, the movement (shift) of the sheet P to the alignment position is completed.

Figure 14A:
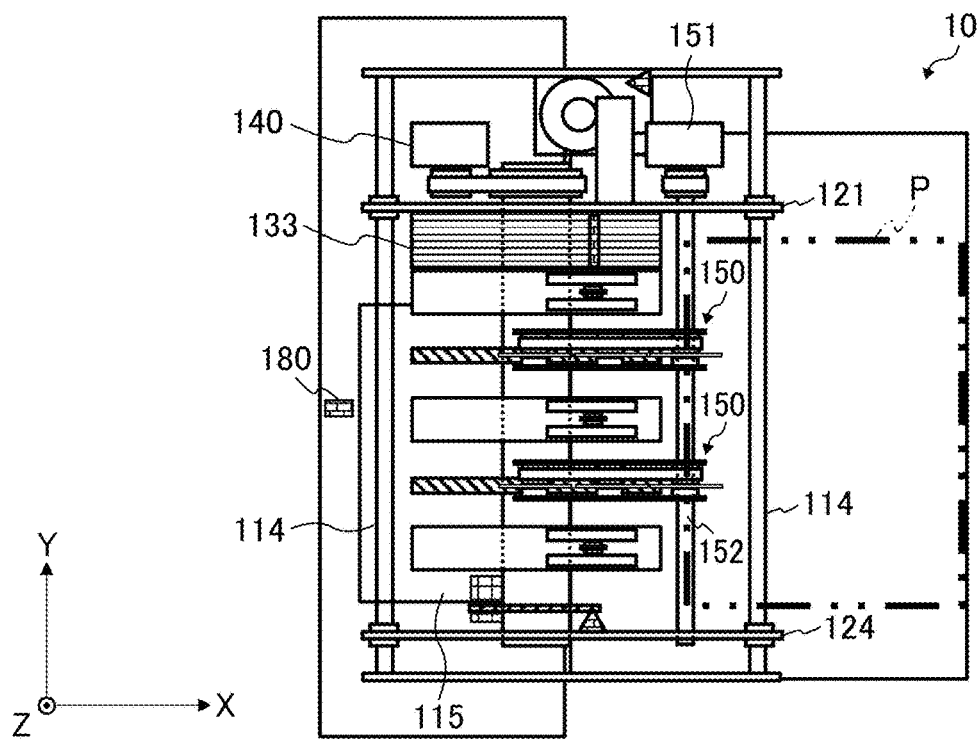
FIGS. 14A and 14B are diagrams each illustrating yet another operation of the sheet stacking process executed in the sheet stacker.
Figure 14B:
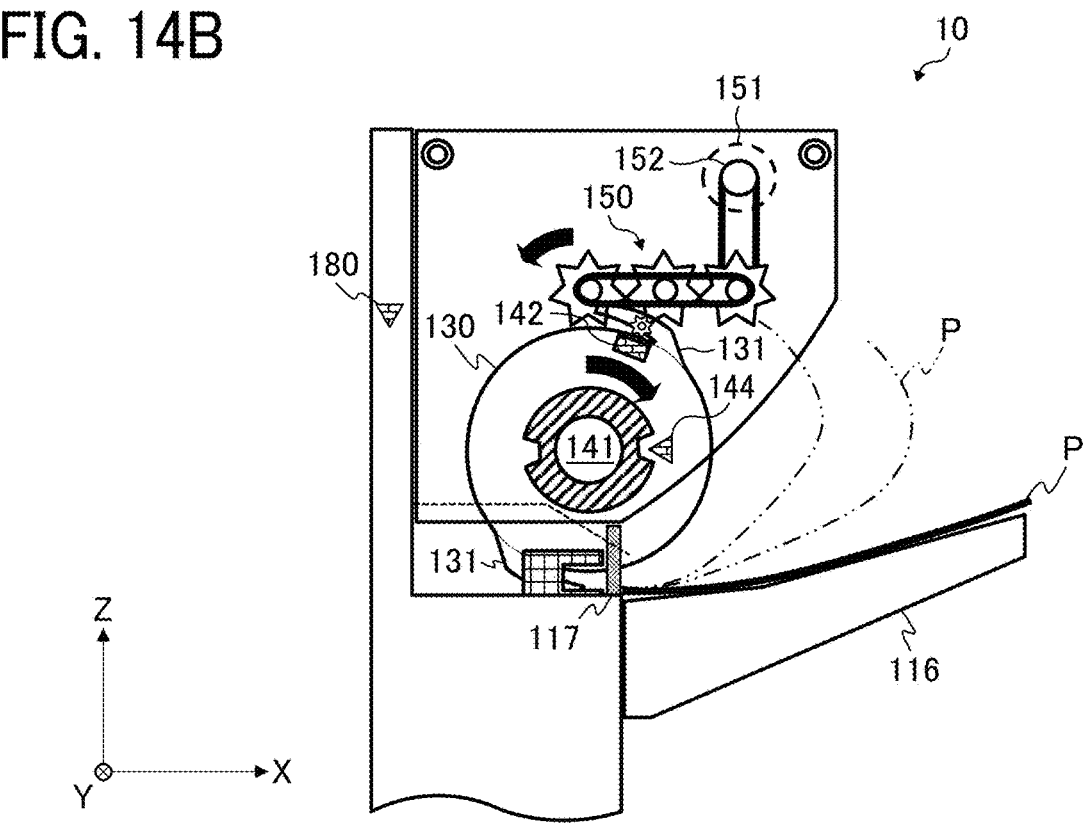

Then, as illustrated in FIGS. 14A and 14B, the spur wheel drive motor 151 restarts to rotate the spur wheel group 155 again (step S1110). With this rotation of the spur wheel group 155, the trailing end of the sheet P is conveyed. Substantially simultaneously, the controller 190 drives the second drive motor 140 to rotate the disk 130 again (step S1111). With this rotation of the disk 130, the leading end of the sheet P in the sheet conveyance direction contacts the leading end stopper 117, so that skew of the sheet P is corrected and the sheet P stops at the leading end stopper 117.

The portion of the disk 130 holding the leading end of the sheet P in the sheet conveyance direction passes through the leading end stopper 117 while the disk 130 rotates, and the sheet P is regulated at the leading end stopper 117. Therefore, the leading end of the sheet P in the sheet conveyance direction is released from the holding state by the pressing member 132 and the outer circumferential surface of the disk 130, thereby coming off from the outer circumferential surface of the disk 130. At this time, the leading end of the sheet P has been aligned at the position of the leading end stopper 117, and the sheet P is stacked at the predetermined position on the movable tray 116.

As illustrated in FIG. 14B, the spur wheel group 155 prevents the trailing end of the sheet P in the sheet conveyance direction to move in the direction to come off from the disk 130 until the sheet P is completely conveyed from the disk 130, and the sheet P moves toward the movable tray 116 while rotating in an arc shape. Accordingly, the sheet P is conveyed while the position of the trailing end in the sheet conveyance direction is completely maintained by the spur wheel group 155. Eventually, the sheet P is stacked on the movable tray 116 with the first face (front face) facing down.

Figure 15A:
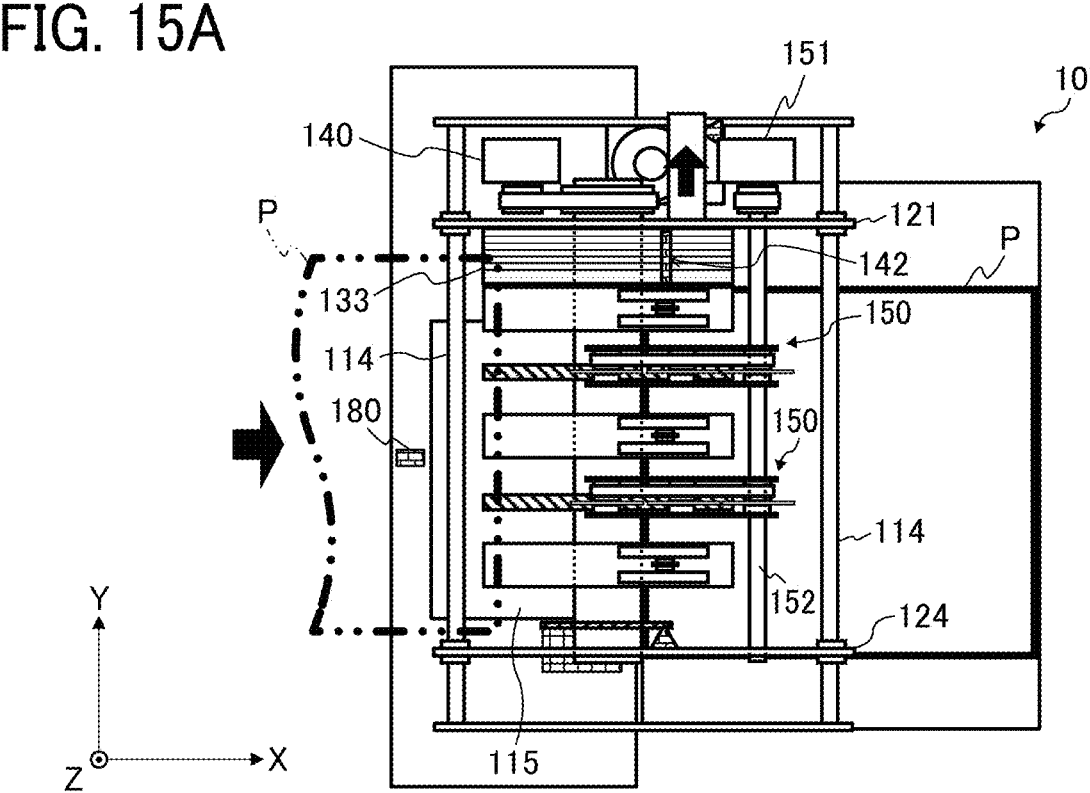
FIGS. 15A and 15B are diagrams each illustrating yet another operation of the sheet stacking process executed in the sheet stacker.
Figure 15B:
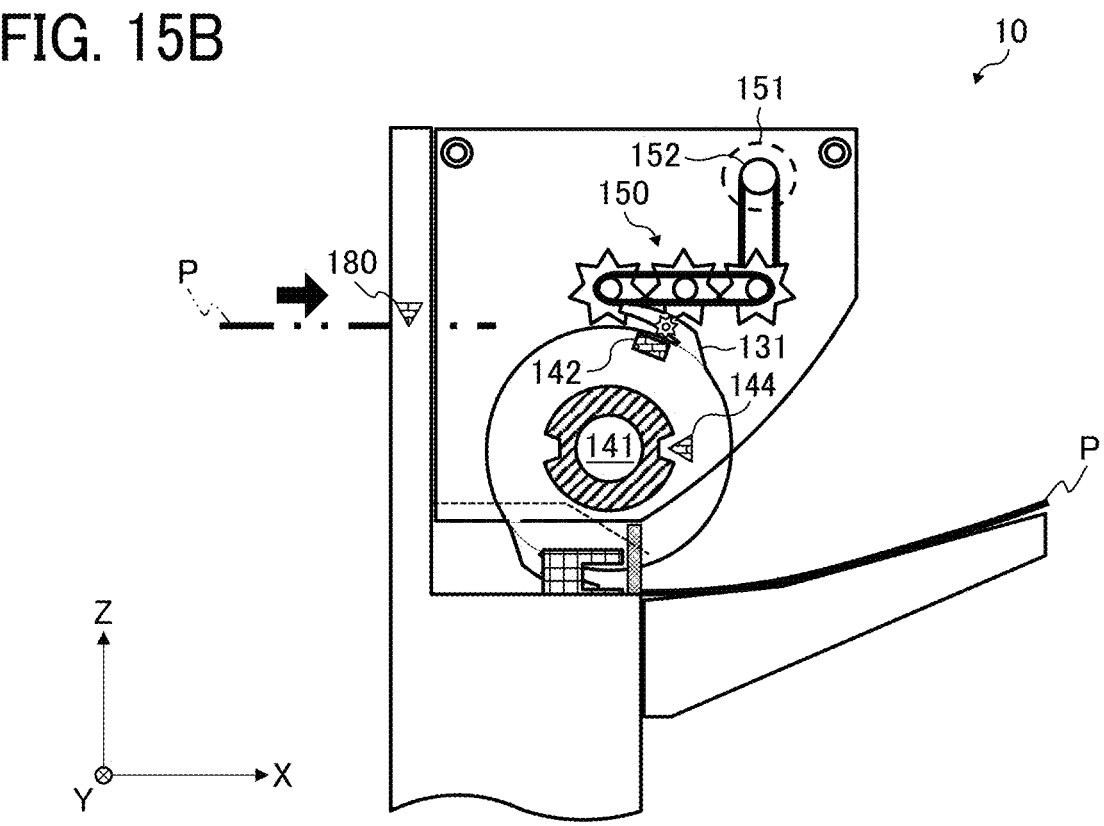

Then, as illustrated in FIGS. 15A and 15B, at the timing at which the trailing end of the sheet P in the sheet conveyance direction has come off from the medium position retainer 150, the recovery operation is performed to return to the state to be ready to receive the subsequent sheet P (step S1112). Here, the recovery operation represents an operation to move the disk unit 120 to the home position and to change the disk 130 back to the state illustrated in FIG. 5.

Note that the timing at which the trailing end of the sheet P in the sheet conveyance direction comes off from the medium position retainer 150 may be determined based on the time elapsed from when the image sensor 142 has stopped detecting the side end of the sheet P. In this case, it is assumed that the conveying speed of the spur wheel group 155 to convey the sheet P is given according to the rotational speed of the spur wheel drive motor 151.

Further, the timing at which the sheet P comes off from the disk 130 may be determined by calculating the timing, based on the time from when the sheet entrance detection sensor 180 has detected the passing of the trailing end of the sheet P in the sheet conveyance direction to when the operation in step S1109 is performed.

By repeating the operations from steps S1101 to S1112, the plurality of sheets P (the bundle of sheets P) is stacked on the movable tray 116 in the alignment state in which the leading ends of the plurality of sheets P are aligned.

Stapling Operation

Figure 16:
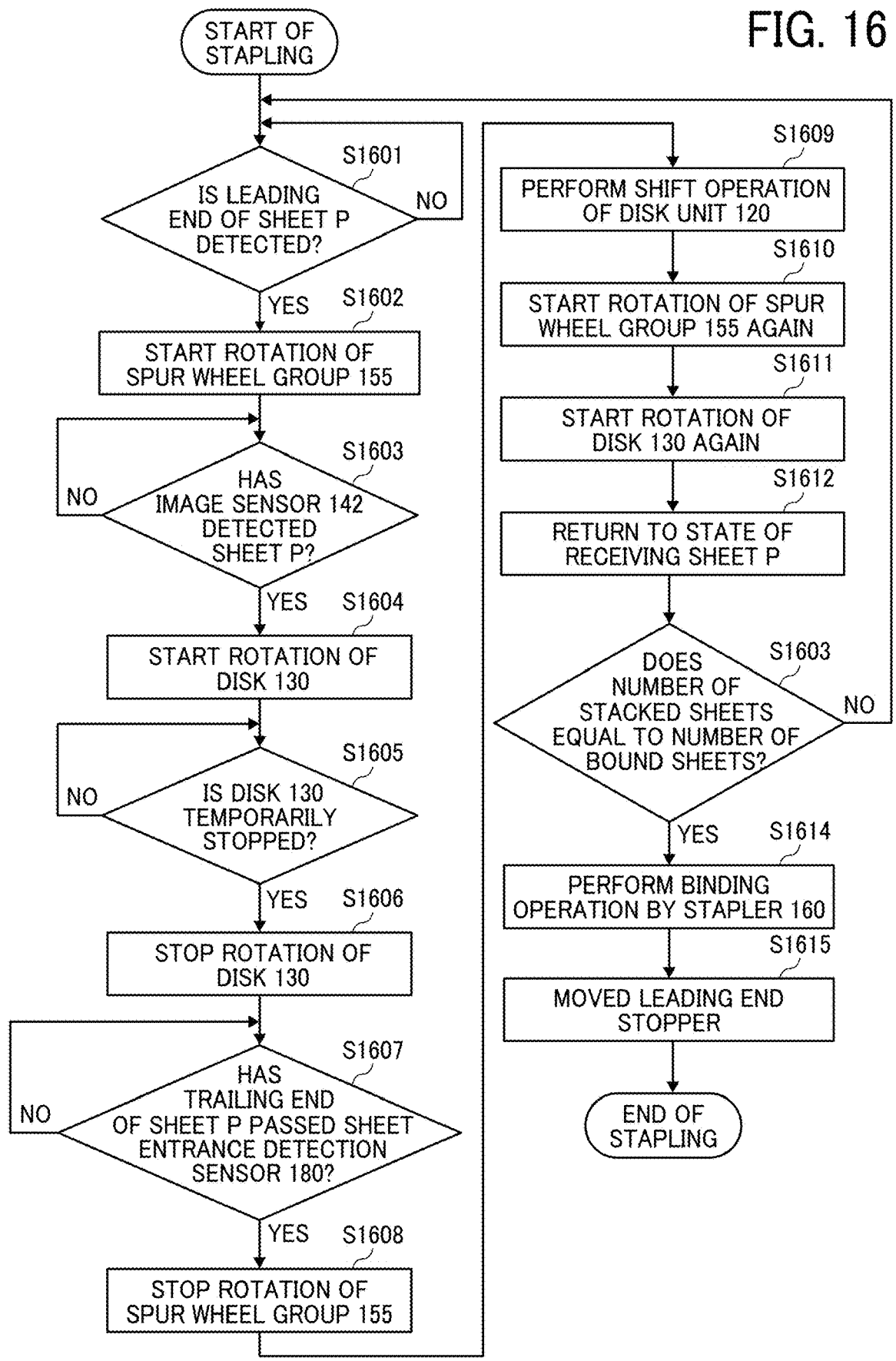
FIG. 16 is a flowchart illustrating the flow of stapling process executed in the sheet stacker.

Next, a description is given of a series of operations performed by the sheet stacker 10 that executes the stapling operation, with reference to the flowchart of FIG. 16 and the drawings of FIGS. 17A to 21B.

Note that, in the drawings of FIGS. 17A to 21B, FIGS. 17A, 18A, 19A, 20A, and 21A are plan views illustrating the sheet stacker 10, and FIGS. 17B, 18B, 19B, 20B, and 21B are front views illustrating the sheet stacker 10.

In addition, the operation of the stapling operation is substantially same as the operation of the stacking operation described above. The stapling operation is different from the stacking operation, mainly in the position of the leading end stopper 117 and the operations of the leading end stopper 117 and the stapler 160. That is, the stapling operation (steps S1601 to S1611) is substantially same as the stacking operation (steps S1101 to S1111) described above and is different from the stacking operation after the operation in step S1612. In the description below, the same operations (steps S1601 to S1611) are summarized and the different operations (after step S1612) are described in detail.

Figure 17A:
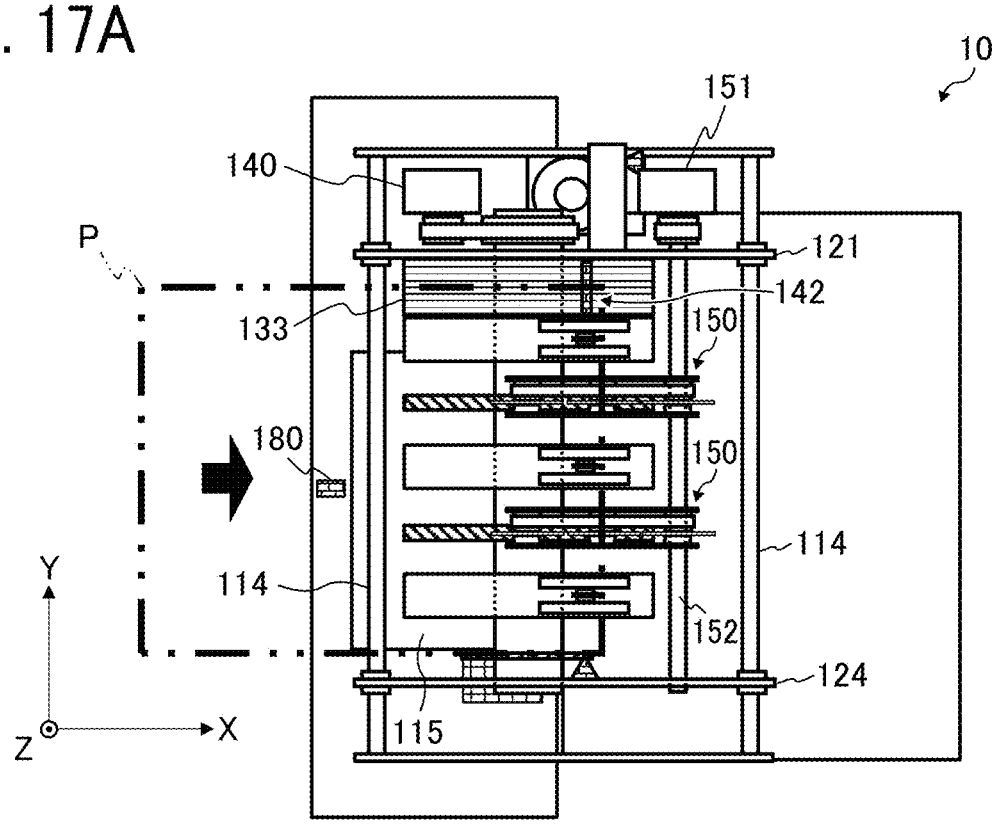
FIGS. 17A and 17B are diagrams each illustrating an operation of the stapling process executed in the sheet stacker.
Figure 17B:
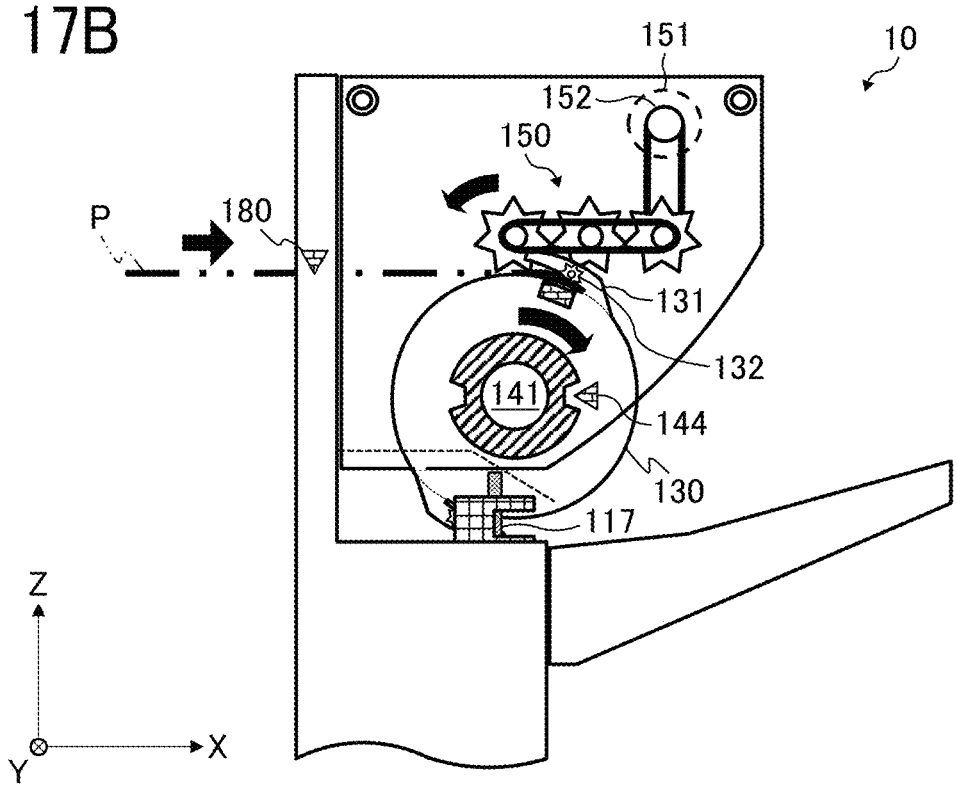
Figure 18A:
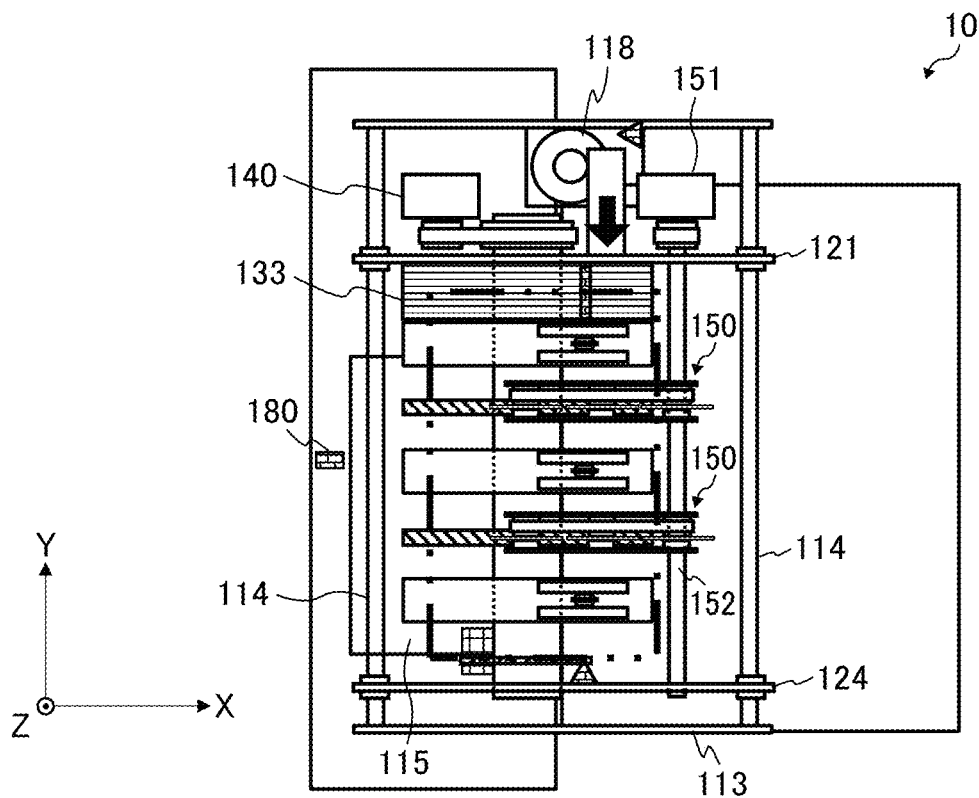
FIGS. 18A and 18B are diagrams each illustrating another operation of the stapling process executed in the sheet stacker.
Figure 18B:
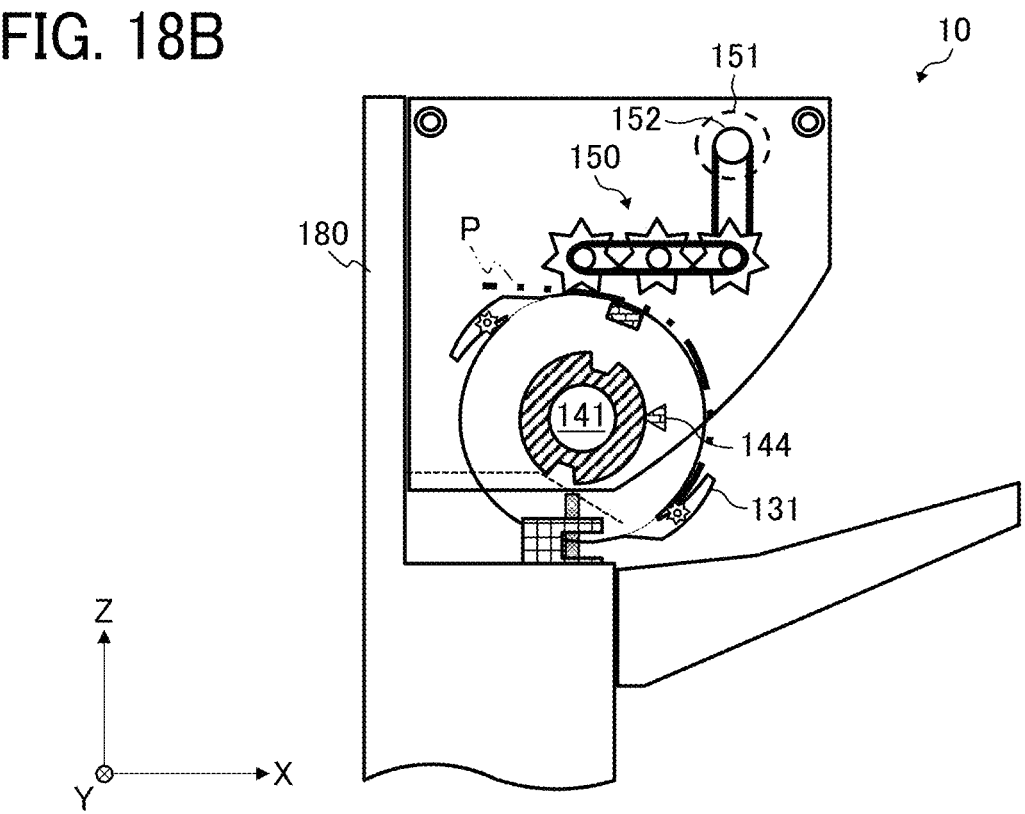
Figure 19A:
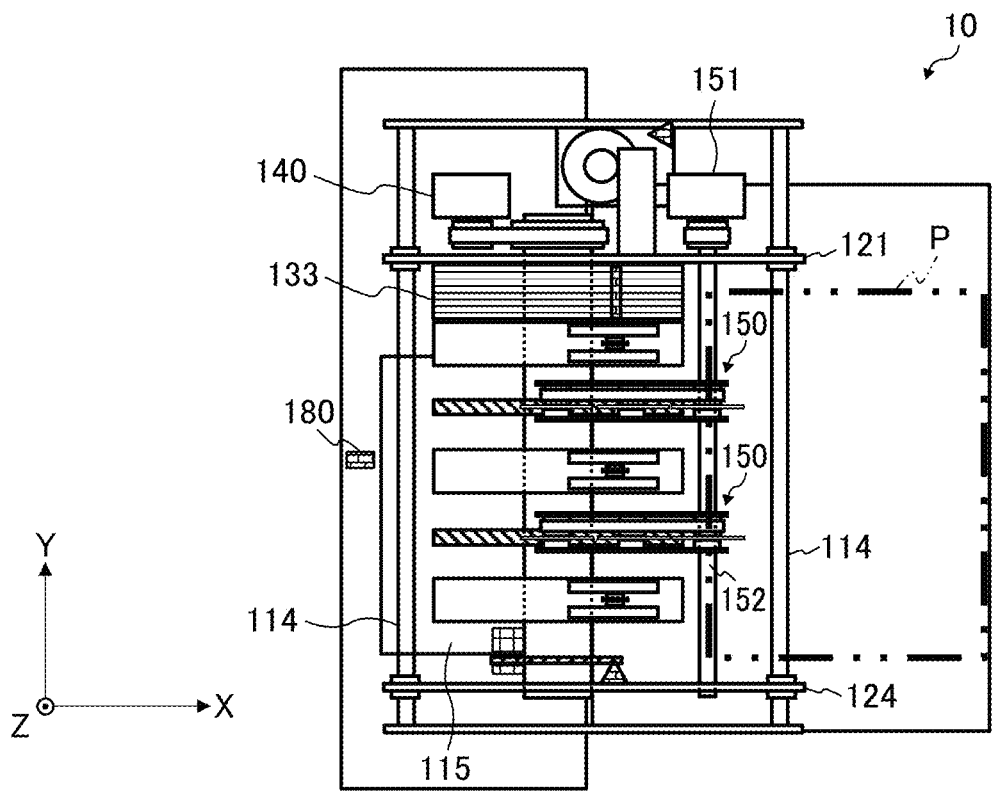
FIGS. 19A and 19B are diagrams each illustrating yet another operation of the stapling process executed in the sheet stacker.

As illustrated in FIGS. 17A and 17B, the controller 190 monitors whether the sheet entrance detection sensor 180 detects (the leading end of) the sheet P, conveyed and ejected from the image forming apparatus 20, with the image formed on the sheet P in the image forming apparatus 20, and drives the spur wheel drive motor 151 to rotate the spur wheel group 155 under the predetermined conditions (steps S1601 and S1602). Further, as illustrated in FIGS. 17A and 17B, the disk 130 is rotated (steps S1603 and S1604). Then, as illustrated in FIG. 18B, the disk 130 is rotated until the slit 131 reaches the position in the temporary stop state, and the spur wheel group 155 is also stopped (steps S1605 to S1608). Then, as illustrated in FIG. 18A, the disk unit 120 is moved to the frame front side panel 113 by the predetermined amount (step S1609). Then, as illustrated in FIGS. 19A and 19B, the spur wheel group 155 is rotated again, and the disk 130 is rotated again substantially simultaneously (steps S1610 and S1611).

Figure 19B:
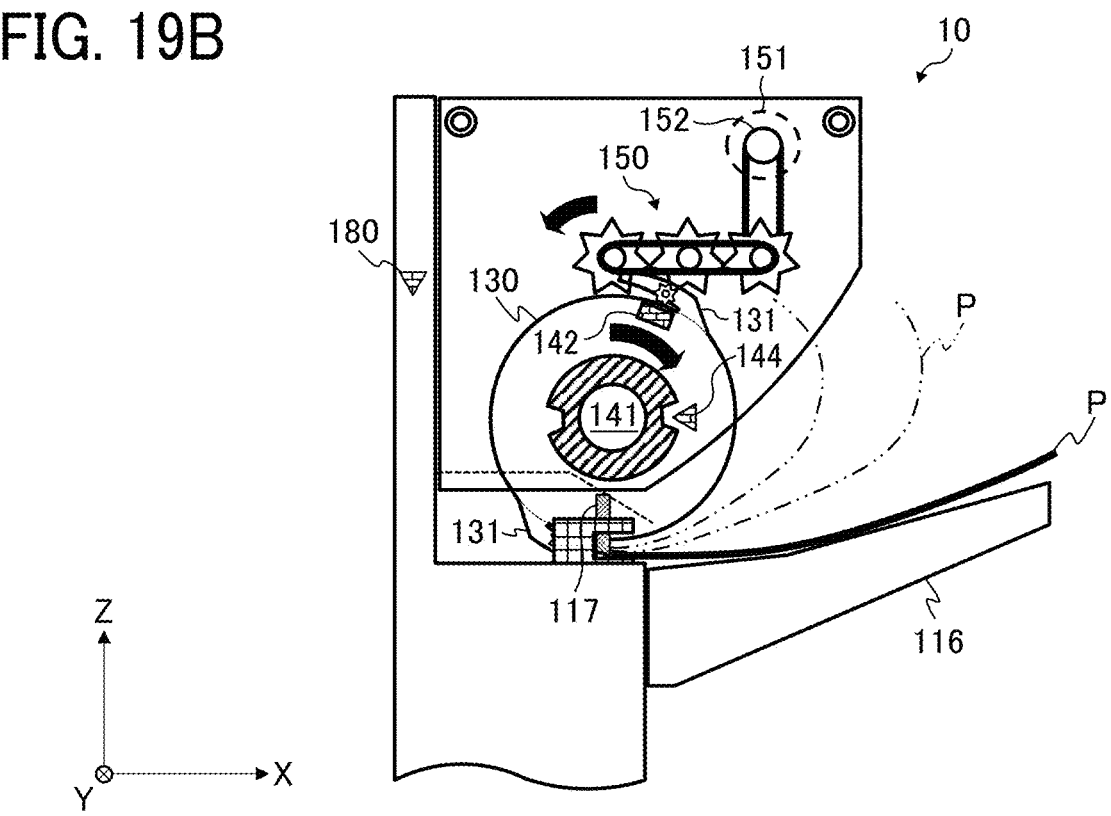
Figure 20A:
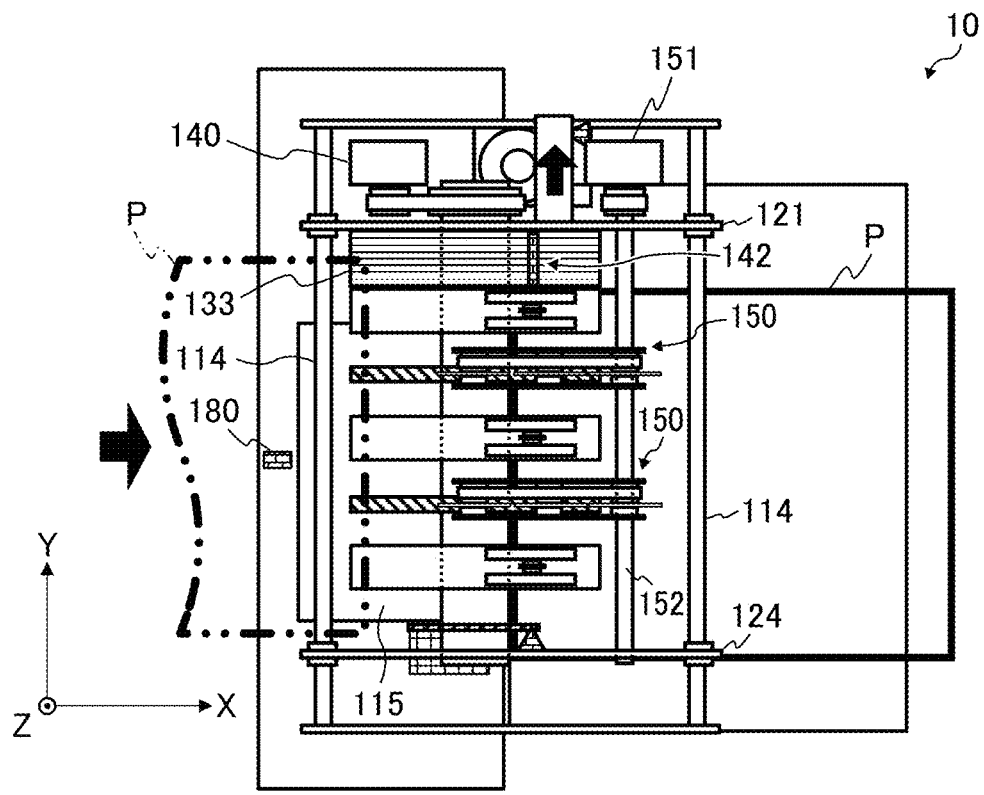
FIGS. 20A and 20B are diagrams each illustrating yet another operation of the stapling process executed in the sheet stacker.
Figure 20B:
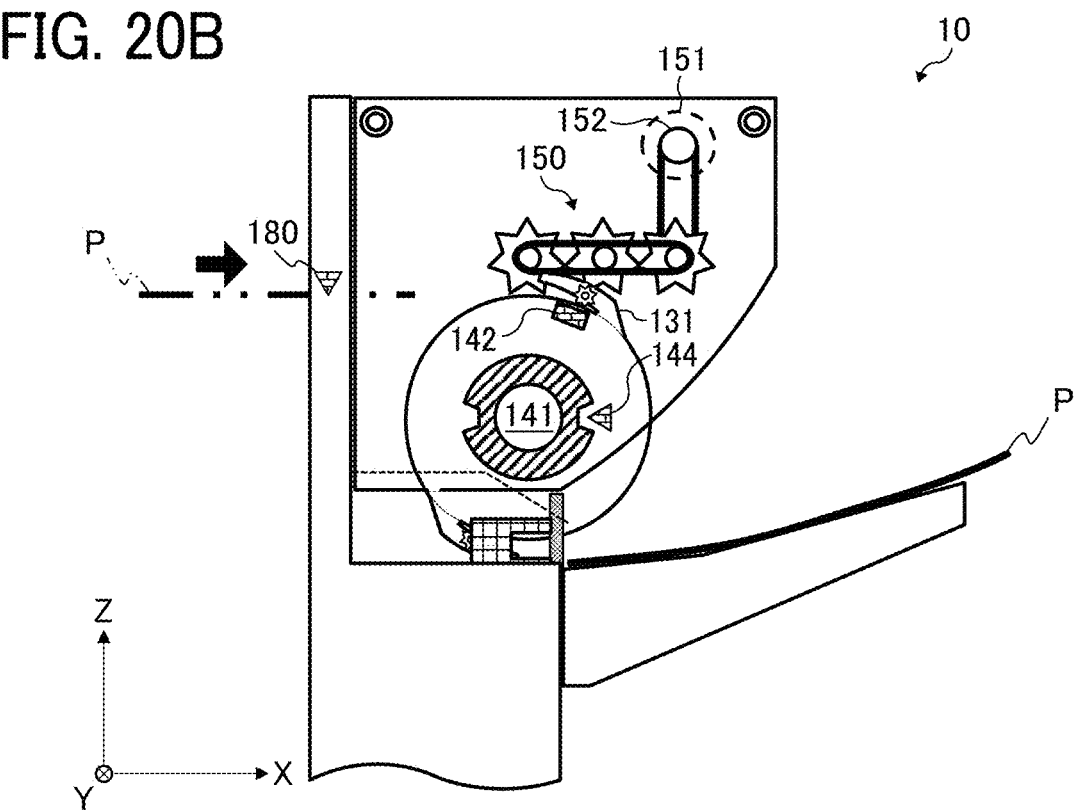
Figure 21A:
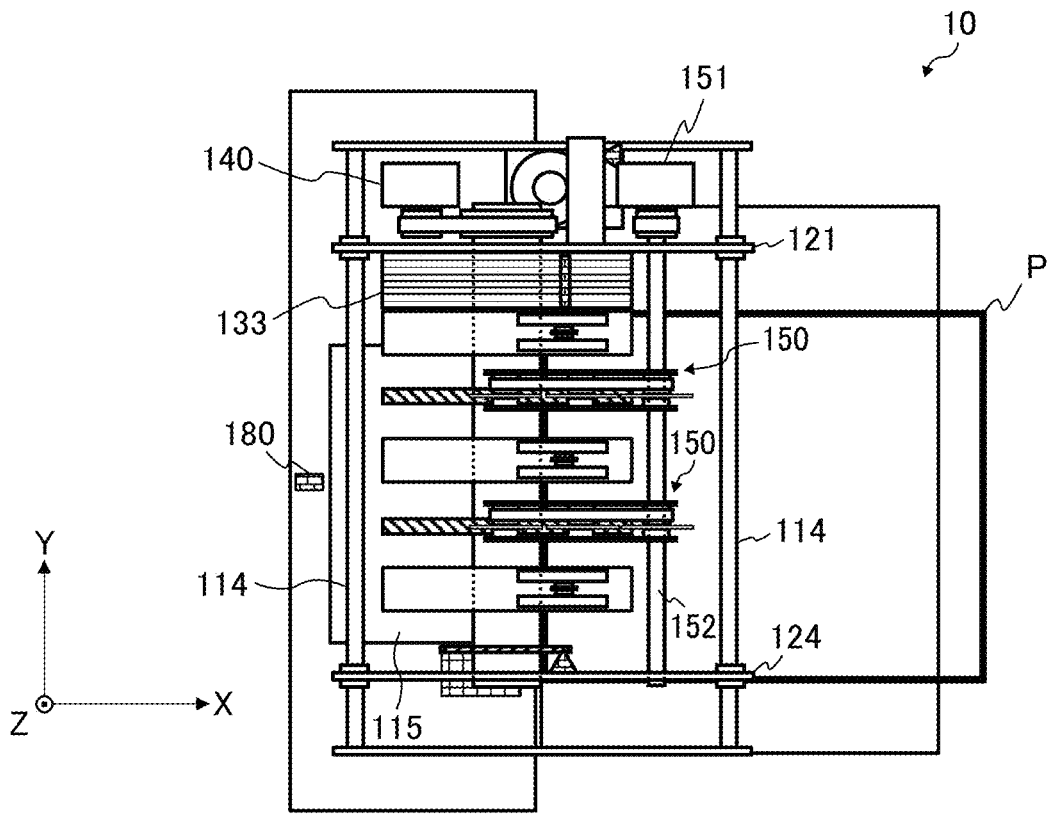
FIGS. 21A and 21B are diagrams each illustrating yet another operation of the stapling process executed in the sheet stacker.
Figure 21B:
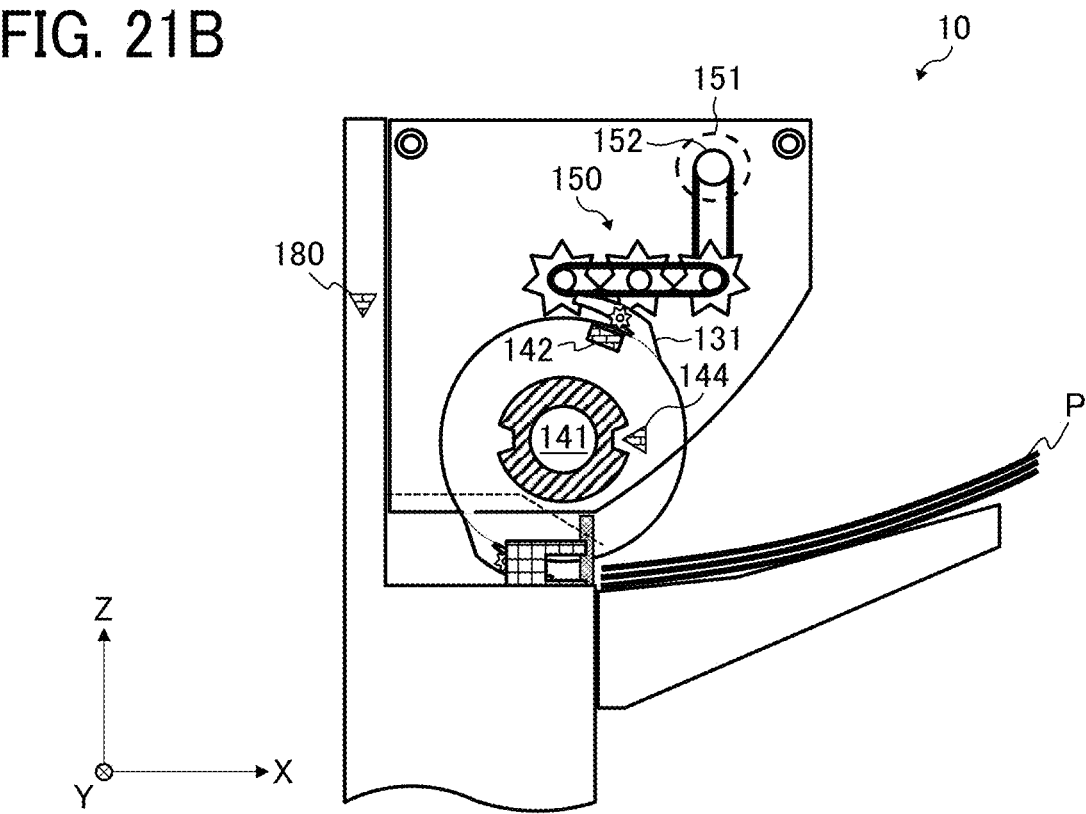

Thereafter, the portion of the disk 130 holding the leading end of the sheet P in the sheet conveyance direction passes through the leading end stopper 117 while the disk 130 rotates, the sheet P is conveyed toward the movable tray 116 while rotating in an arc shape and is stacked on the movable tray 116, as illustrated in FIG. 19B, and the disk unit 120 is changed back to the state to be ready to receive the subsequent sheet P, as illustrated in FIGS. 20A and 20B (step S1612).

Then, the controller 190 determines whether or not the number of sheets P has reached the predetermined number to perform the binding operation, based on the detection result of the sheet stack height sensor 170 (step S16013). When the number of sheets P has not reached the predetermined number to perform the binding operation (NO in step S1613), the operation returns to step S1601 to execute the stacking operation of the subsequent sheet P.

When the number of sheets P has reached the predetermined number to perform the binding operation (YES in step S1613), the controller 190 causes the stapler 160 to move to perform the binding operation (step S1614), and causes the leading end stopper 117 to move to the distal end of the fixed tray 115 (step S1615). With this operation, the bundle of the predetermined number of sheets P is bound to a binding booklet and is stacked on the movable tray 116. In addition, by repeating the operation from step S1601, the binding booklets are produced by the predetermined number Effects of the Present Embodiment With the above-described sheet stacker 10, the sheet P with liquid material adhered on the surface is rotated and conveyed by rotary portions including the disks 130 disposed at intervals while being promoted to dry, and the warp of the sheet P is corrected to be aligned easily. Further, the leading end of the rotated and conveyed sheet P contacts the leading end stopper 117 to correct skew of the sheet P and the position of the sheet P for each rotary portion is changed based on the detection result of the image sensor 142, and then the sheet P is released at the stacking position. By so doing, the positional deviation of the sheet P in the sheet conveyance direction is corrected, and therefore the sheet alignment operation is performed without contacting the sheets P each other with friction.

Further, by getting rid of the sheet alignment operation of the sheets P after the sheets P are stacked on the tray, a reduction in size of the whole apparatus or system is enhanced.

Further, by using the spur wheel (or spur wheels) in order not to distort the position of the sheet P while the sheet P is conveyed, the size of the contact area in which the mechanism to retain the position of the sheet P contacts the image forming surface of the sheet P is reduced, and the position of the sheet P is retained reliably. Therefore, it is difficult to have smudge on the image forming surface. Further, the trailing end of the sheet P in the sheet conveyance direction is easily caught by an uneven surface (having convex and concave portions) of the spur wheel. Therefore, while the position of the sheet P including the portion that is not held by the disk 130 is maintained when the sheet P is rotated and conveyed, the whole area of the sheet P is conveyed reliably.

As the operating modes of the sheet stacker 10 in the above-described embodiments of the present disclosure, the stacking mode and the stapling mode are explained. However, the operating mode of the sheet stacker 10 is not limited to the above-described operating modes. For example, while one moving position of the sheet P is employed in the above-described stacking mode, a plurality of moving positions of the sheet P may be given. Further, it may be controlled to change the moving position (stacking position) of the sheet P per print job of the image forming operation performed to the plurality of sheets P, so that a shift mode is given to sort the bundle of sheets P by the predetermined number of sheets P.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A medium stacker comprising:
a stacking portion having a stacking face to stack a sheet medium on which an image is formed;
a rotary portion configured to hold a leading end of the sheet medium in a sheet conveyance direction, reverse the sheet medium on the stacking face of the stacking portion, and convey the sheet medium;
a medium holder configured to hold the sheet medium when the sheet medium is conveyed by the rotary portion;
a medium mover configured to move the sheet medium to a predetermined position in a direction orthogonal to the sheet conveyance direction of the sheet medium while the sheet medium is held by the rotary portion; and
circuitry configured to control the rotary portion and the medium mover,
wherein the medium holder includes:
a first holder configured to hold the leading end of the sheet medium in the sheet conveyance direction, on an outer circumferential surface of the rotary portion; and
a second holder configured to hold a portion of the sheet medium other than the leading end of the sheet medium, on the rotary portion when the sheet medium is conveyed by the rotary portion,
wherein the second holder includes a rotary member configured to rotate to convey the sheet medium, and
wherein the circuitry is configured to control a rotational speed of the rotary member.

2. The medium stacker according to claim 1,
wherein the rotary member includes a rotary body group including a plurality of rotary bodies configured to partly contact the sheet medium in the sheet conveyance direction.

3. The medium stacker according to claim 1, further comprising:
a first drive source configured to rotate the rotary portion; and
a second drive source configured to rotate the rotary member, the first drive source being independent of the second drive source,
wherein the circuitry is configured to control the first drive source and the second drive source so that a rotational speed of the rotary member is equal to or greater than a rotational speed of the rotary portion.

4. The medium stacker according to claim 2,
wherein the first holder includes a pressing mechanism configured to press the leading end of the sheet medium against the outer circumferential surface of the rotary portion.

5. The medium stacker according to claim 4,
wherein the pressing mechanism includes a rotary body configured to press the leading end of the sheet medium against the outer circumferential surface of the rotary portion and partly contact the sheet medium.

6. The medium stacker according to claim 1, further comprising a sheet entrance detector configured to detect receipt of the sheet medium from a device disposed upstream from the medium stacker in the sheet conveyance direction and coupled with the medium stacker,
wherein the circuitry is configured to control the rotary portion according to a detection result of the receipt of the sheet medium by the sheet entrance detector.

7. The medium stacker according to claim 1,
wherein the rotary portion includes a circular member mounted on a rotary shaft disposed in a direction orthogonal to the sheet conveyance direction of the sheet medium.

8. The medium stacker according to claim 1, further comprising a leading end regulator configured to regulate a position of a leading end of the sheet medium while the sheet medium reversed and conveyed by the rotary portion is stacked on the stacking face,
wherein the leading end regulator is configured to regulate the position of the leading end of the sheet medium at a different position in the sheet conveyance direction according to a post-processing operation to the sheet medium.

9. The medium stacker according to claim 8, further comprising a binder configured to perform a binding operation on an end of a plurality of sheet media including the sheet medium stacked on the stacking face,
wherein the leading end regulator is configured to regulate the position of the leading end of the sheet medium to locate the binder at a position to perform the binding operation when the binding operation is selected as the post-processing operation.

10. An image forming system comprising:
an image forming apparatus including:
an image forming device configured to form an image on a sheet medium with a liquid material; and
a sheet conveying device configured to convey the sheet medium having the image formed by the image forming device; and
the medium stacker according to claim 1, the medium stacker being configured to stack the sheet medium conveyed from the image forming apparatus.

11. A medium stacker comprising:
a stacking portion having a stacking face to stack a sheet medium on which an image is formed;
a rotary portion configured to hold a leading end of the sheet medium in a sheet conveyance direction, reverse the sheet medium on the stacking face of the stacking portion, and convey the sheet medium;
a medium holder configured to hold the sheet medium when the sheet medium is conveyed by the rotary portion;
a medium mover configured to move the sheet medium to a predetermined position in a direction orthogonal to the sheet conveyance direction of the sheet medium while the sheet medium is held by the rotary portion; and
circuitry configured to control the rotary portion and the medium mover;
wherein the medium mover is configured to move the medium holder together with the sheet medium in a same direction as a direction of movement of the sheet medium.

12. The medium stacker according to claim 11, further comprising a medium side detector configured to detect a position of an end of the sheet medium held by the rotary portion, in a direction orthogonal to the sheet conveyance direction of the sheet medium, wherein the medium mover is configured to determine an amount of movement of the sheet medium based on a detection result by the medium side detector.

13. A medium stacker comprising:
a stacking portion having a stacking face to stack a sheet medium on which an image is formed;
a rotary portion configured to hold a leading end of the sheet medium in a sheet conveyance direction, reverse the sheet medium on the stacking face of the stacking portion, and convey the sheet medium;
a medium holder configured to hold the sheet medium when the sheet medium is conveyed by the rotary portion,
the medium holder includes:
   a first holder configured to hold the leading end of the sheet medium in the sheet conveyance direction, on an outer circumferential surface of the rotary portion; and
   a second holder configured to hold a portion of the sheet medium other than the leading end of the sheet medium, on the rotary portion when the sheet medium is conveyed by the rotary portion; and
circuitry configured to control the rotary portion;
wherein the second holder includes a rotary member configured to rotate to convey the sheet medium, and
wherein a rotational speed of the rotary member is configured to be controlled by the circuitry.

14. The medium stacker according to claim 13,
wherein the rotary member includes a rotary body group including a plurality of rotary bodies configured to partly contact the sheet medium in the sheet conveyance direction.

15. The medium stacker according to claim 13,
wherein a drive source of the rotary portion is different from a drive source of the rotary member, and
wherein a rotational speed of the rotary member is equal to or greater than a rotational speed of the rotary portion.

16. The medium stacker according to claim 13,
wherein the first holder includes a pressing mechanism configured to press the leading end of the sheet medium against the outer circumferential surface of the rotary portion.

17. An image forming system-comprising:
an image forming apparatus including:
   an image forming device configured to form an image on a sheet medium with a liquid material; and
   a sheet conveying device configured to convey the sheet medium having the image formed by the image forming device; and
the medium stacker according to claim 13, the medium stacker being configured to stack the sheet medium conveyed from the image forming apparatus.

* * * * *